(12) United States Patent
Julien

(10) Patent No.: US 6,571,665 B2
(45) Date of Patent: Jun. 3, 2003

(54) CUTTING INSTRUMENTS

(75) Inventor: Gerald J. Julien, Puyallup, WA (US)

(73) Assignee: Nitinol Technologies, Inc., Puyallup, WA (US)

(*) Notice: Subject to any disclaimer, the term of this patent is extended or adjusted under 35 U.S.C. 154(b) by 0 days.

(21) Appl. No.: 09/962,978

(22) Filed: Sep. 24, 2001

(65) Prior Publication Data

US 2002/0083598 A1 Jul. 4, 2002

Related U.S. Application Data

(62) Division of application No. 09/125,218, filed on Aug. 13, 1998, now Pat. No. 6,293,020.
(60) Provisional application No. 60/036,784, filed on Jan. 28, 1997, provisional application No. 60/029,251, filed on Oct. 24, 1996, and provisional application No. 60/011,648, filed on Feb. 14, 1996.

(51) Int. Cl.$^7$ .............................................. B21K 11/02

(52) U.S. Cl. ........................................ 76/104.1; 76/112

(58) Field of Search ...................... 30/346.53, 346.54, 30/350; 76/104.1, 112, DIG. 8; 451/41; 60/527, 528

(56) References Cited

U.S. PATENT DOCUMENTS 6,254,458 B1 * 7/2001 Julien ........................... 451/41
6,293,020 B1 * 9/2001 Julien ........................... 30/350
6,422,010 B1 * 7/2002 Julien ........................... 60/527

* cited by examiner

Primary Examiner—Hwei-Siu Payer
(74) Attorney, Agent, or Firm—J. Michael Neary

(57) ABSTRACT

A process for making a cutting instrument includes cutting a blank from a plate or strip of Type 60 Nitinol, having a thickness of between 0.005"–0.500" using an abrasive waterjet, wire electron discharge machining or laser cutting, and grinding top and bottom surfaces of the blank by rotating a grinder having cubic boron nitride or diamond abrasive particles on a cutting surface of said grinder against the knife blank at a surface speed of about 5000 to 7000 surface feet per minute and grinding to a depth of about 0.001 to 0.005 inches per pass to remove material along the blade surface. The surface of the blade is polished to a surface finish smoother than 20 microinches RMS using Turkish emery abrasive grinding/polishing materials on a buffing wheel driven by a high power motor. The blade is then finish polished to a mirror-like luster of 2 microinches RMS or less using a fine diamond buffing compound and a buffing wheel running at about 3000 RPM. An edge is ground into the polished blade blank using an Arkansas stone grinder.

4 Claims, 21 Drawing Sheets

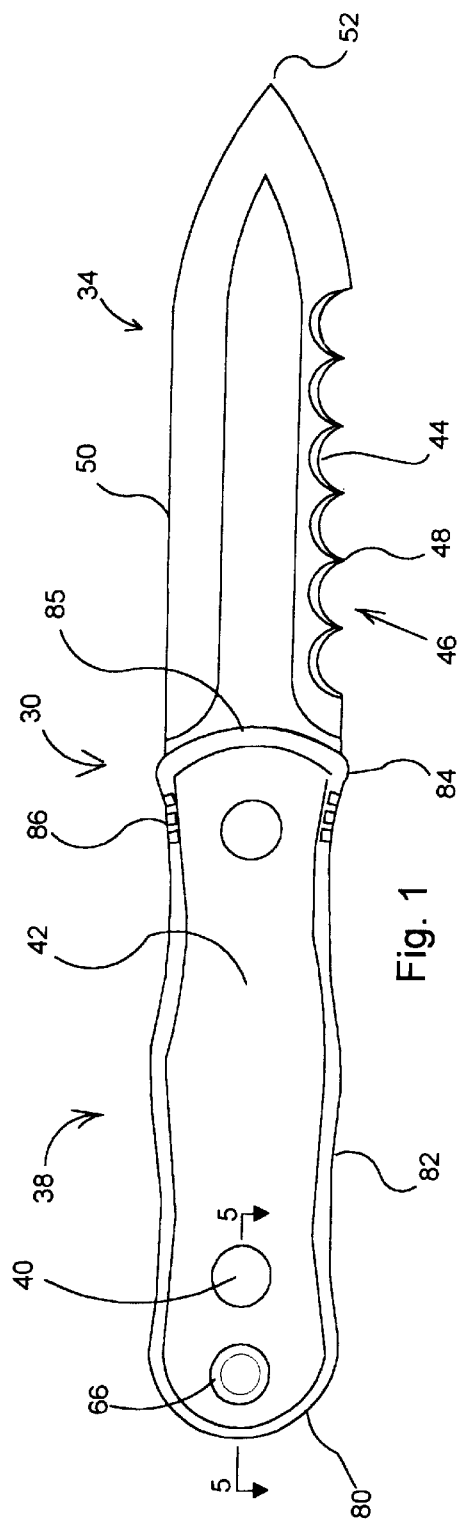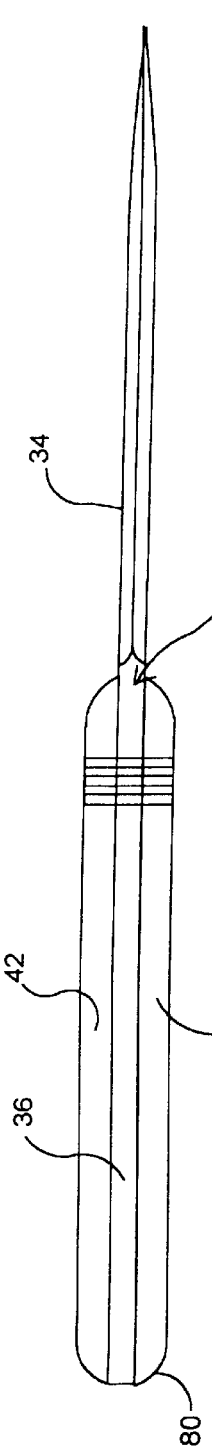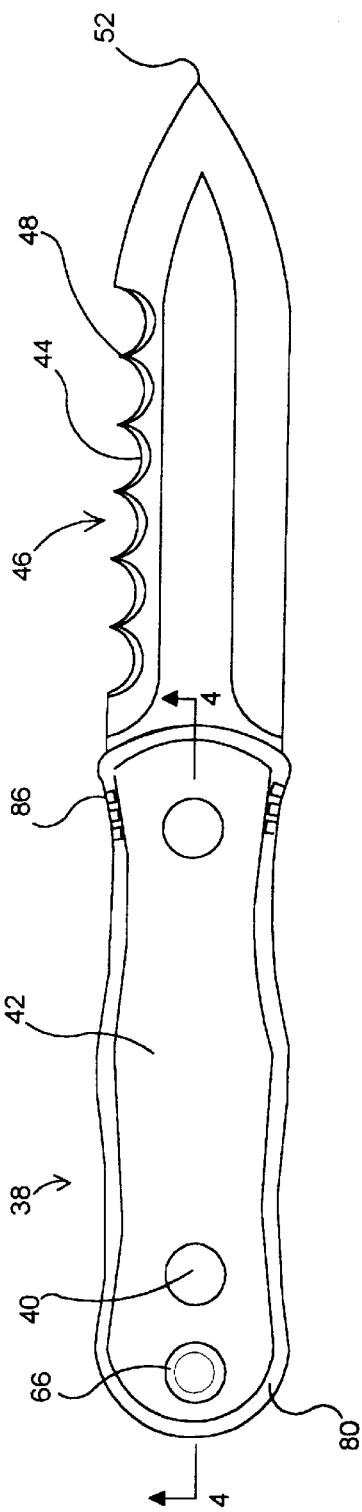

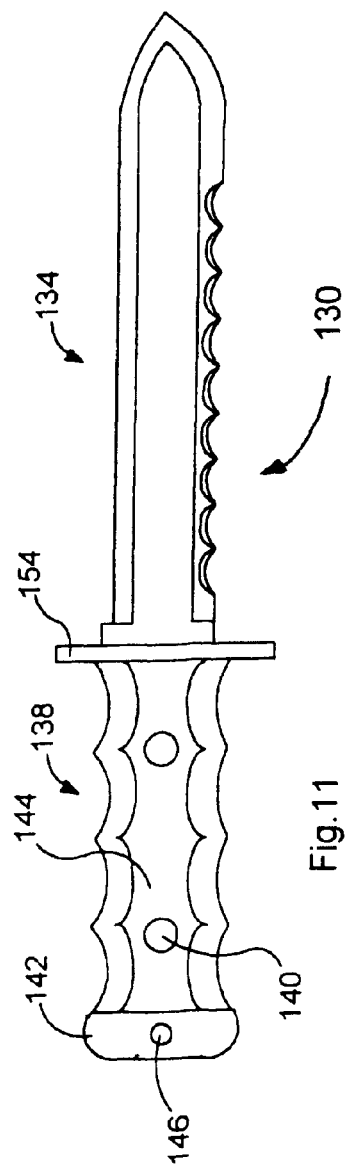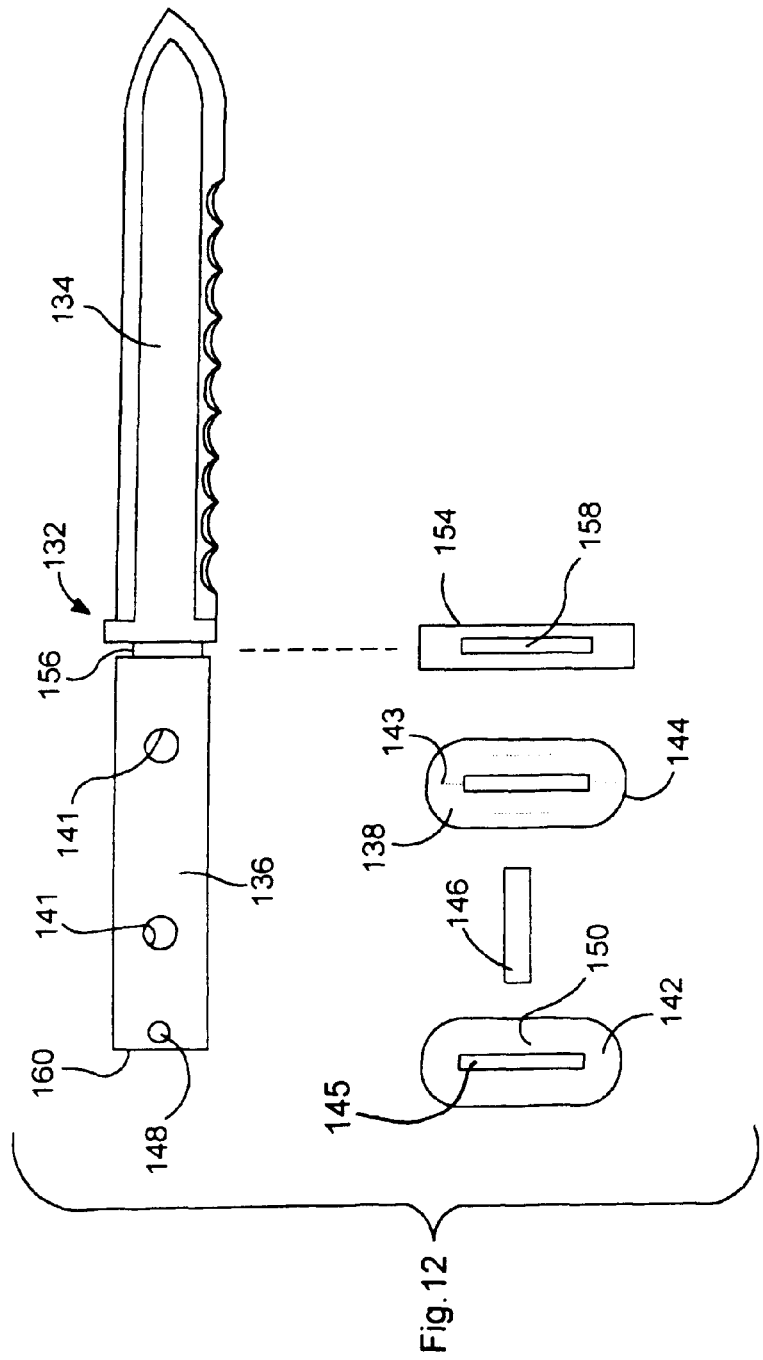

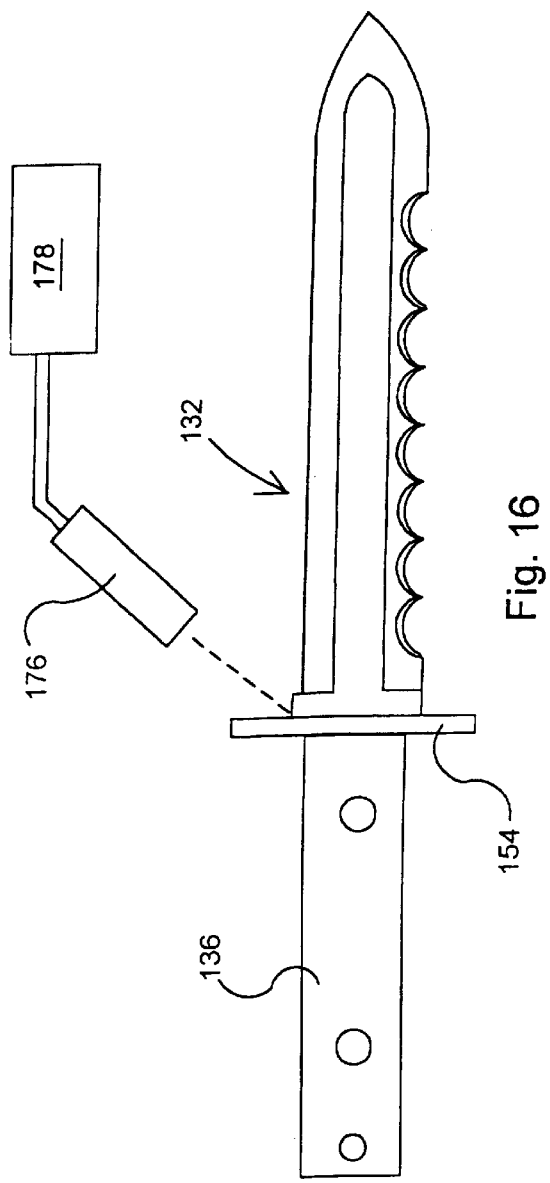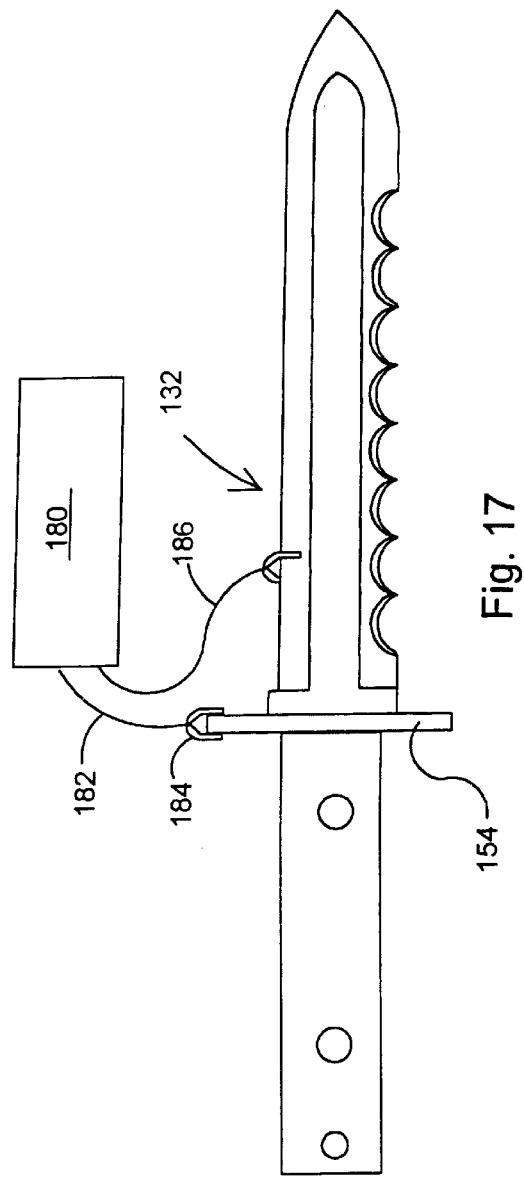

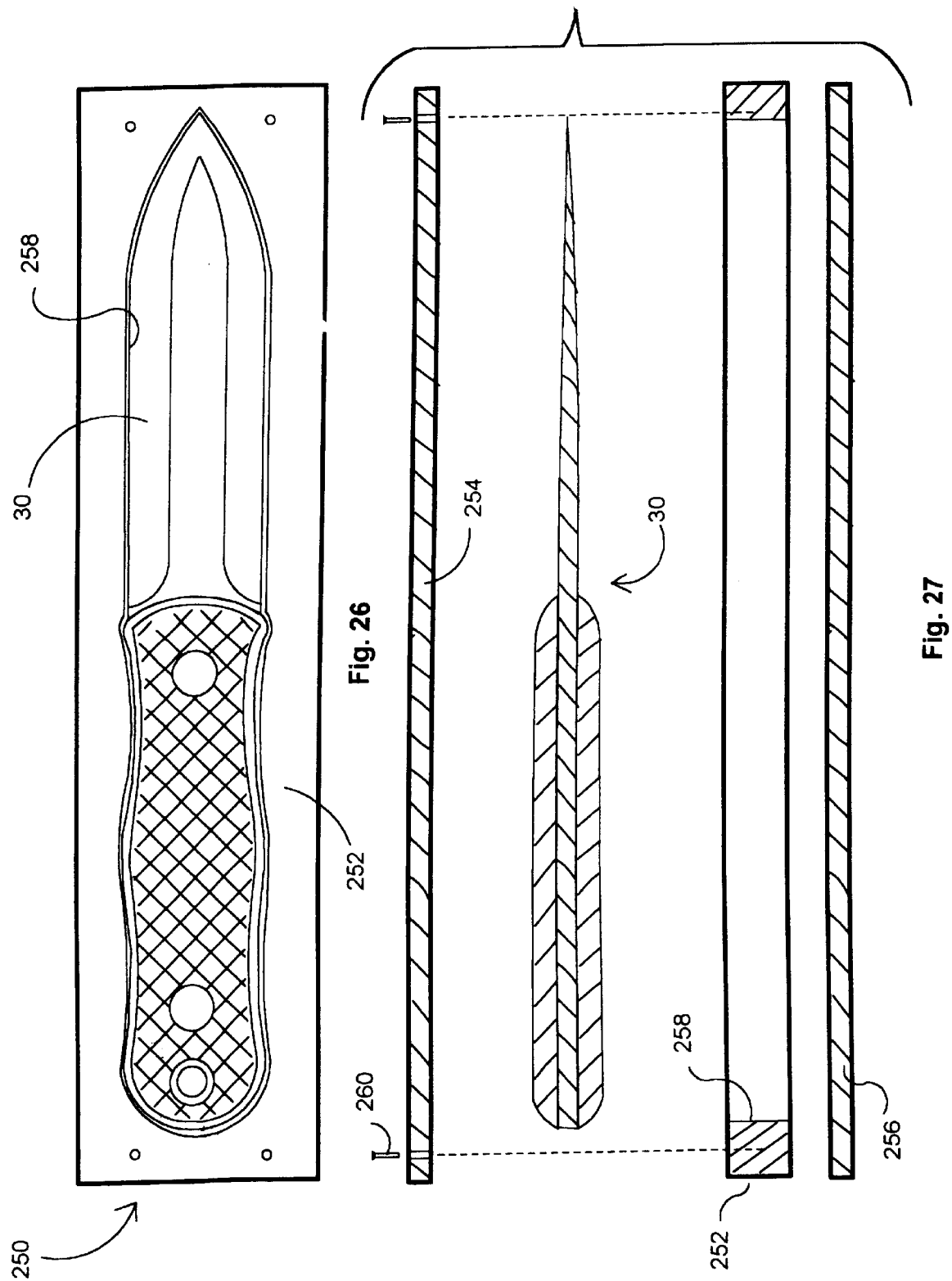

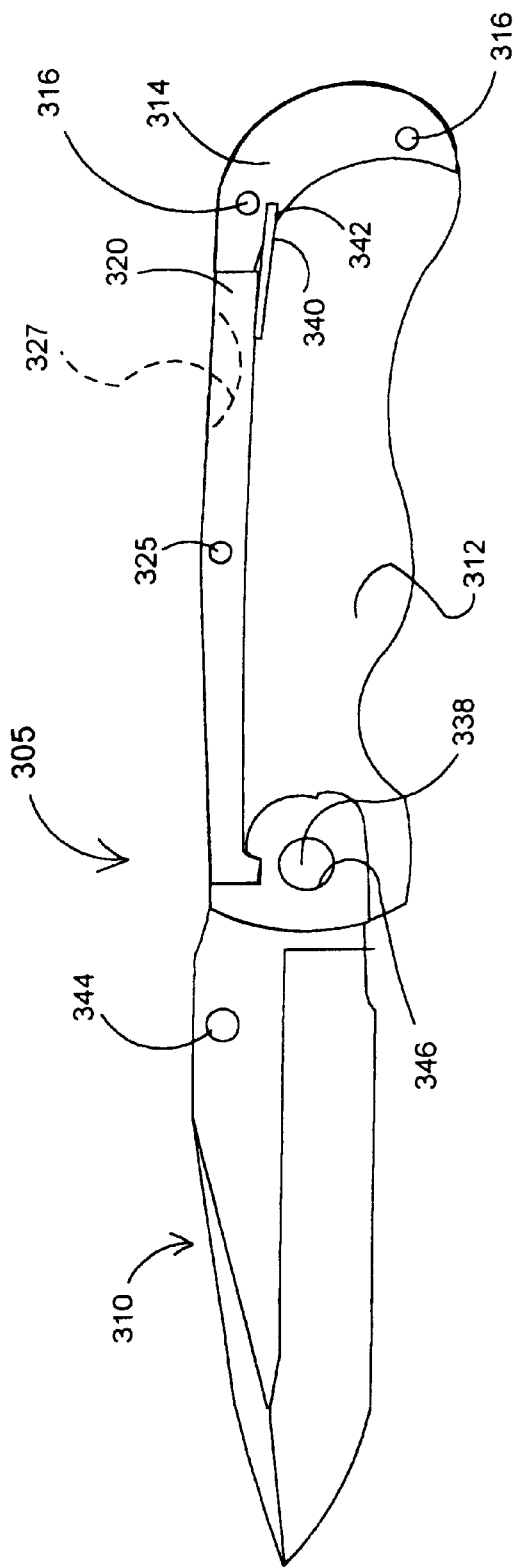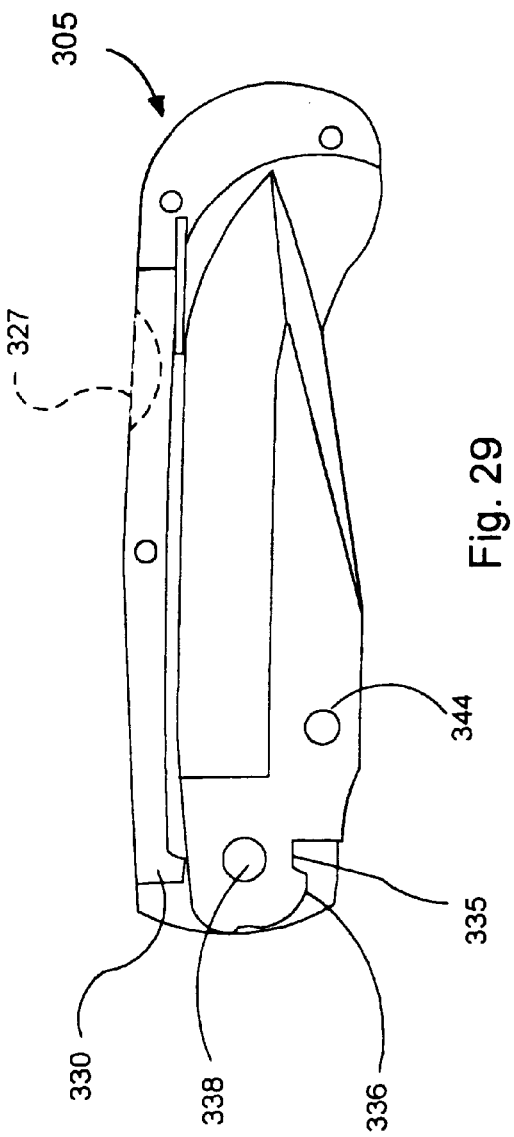
Fig. 28
Fig. 29

CUTTING INSTRUMENTS

This application is a division of U.S. Ser. No. 09/125,218 filed Aug. 13, 1998, now U.S. Pat. No. 6,293,020. This application claims the benefit of provisional application Nos. 60/036,784 filed Jan. 28, 1997, 60/029,251 filed Oct. 24, 1996 and 60/011,648 filed Feb. 14, 1996.

This invention relates to hard and tough tools and knives capable of holding an edge and resisting corrosion better than conventional materials used for cutting instruments, and more particularly to processes for making cutting instruments of Type 60 Nitinol to produce tools and knives that are hard, tough, and elastic, and which are virtually immune to corrosion.

BACKGROUND OF THE INVENTION

The development of Damascus steel in the 5th century produced a hard and tough material that was, and still is, prized for knives and swords. However, the process of manufacturing Damascus steel is arduous and expensive, and the material is susceptible to rusting and other corrosion, so it must be kept oiled and otherwise protected from corrosive influences. Because of its susceptibility to corrosion and the need to keep it oiled to prevent such corrosion, Damascus steel is not suitable for food preparation, skinning game or other meat cutting applications, so its usefulness in the real world is limited. Its primary application is for display knives and swords because of the distinctive banded appearance of the material.

Since the development of Damascus steel, the most important commercial development in the field of cutlery materials in the last century has been corrosion resistant steel, more commonly (although inaccurately) called "stainless steel". Stainless steel is characterized by the inclusion of chromium and sometimes nickel in the composition which makes it significantly more corrosion resistant than other types of steels, and as a result is now very widely used in most cutlery. However, in order to obtain the hardness necessary for retaining a decent cutting edge, the material must be well above 400 on the Brinell scale, or 42 on the Rockwell C scale, and preferably above 500 Brinell. Compositions of corrosion resistant steel having high hardness have been developed, such as 440C which can be heat treated to a hardness of about 56 on the Rockwell C scale. That is an adequate hardness for retaining a good cutting edge, but this material also has a high carbon content of about 1.5% and is difficult to machine. The high carbon content results in reduced corrosion resistance, resulting in a tendency for the cutting edges of knives made from this material to become dull because the thin cusp of the cutting edge corrodes away, leaving a rounded edge. This is particularly true for environments containing the chlorine ion, such as sea water and chlorine cleaning solutions used in food preparation areas. The cost of knives made from 440C stainless steel is higher than knives made from other material because processing the material and machining the blade shape is more difficult than it is for other knife materials. Finally, knives made of 440C stainless steel have a tendency to lose their luster over a relatively short time because of tarnishing, stains and corrosion, resulting in a knife blade with an unattractive, dingy appearance which customers dislike.

FDA requirements for knives used in meat cutting and fish processing operations have very stringent corrosion resistance standards which limit the carbon content of the stainless steel to no more than 0.10%. Corrosion resistant steels are available that meet these requirements and knives made from them do indeed exhibit adequate corrosion resistance for safe use in meat cutting and fish processing facilities. However, these materials are soft, less than 200 on the Brinell scale, and knives made from these materials dull quickly and must be sharpened continually. As a consequence, these knives last only a short time before they are sharpened away and are discarded. This industry has long needed a knife that is approved for use around meat, poultry and fish by the U.S. FDA and would remain sharp for long periods of constant use without sharpening.

In the field of cutting instruments other than cutlery, the most significant commercially development in the last century has been sintered carbides of silicon, tungsten and titanium in a metallic matrix of cobalt or other toughening metals. Carbides are very hard and hold a cutting edge better than most other materials, but they are brittle and tend to shatter when stressed beyond their yield strength. When designed properly and used within the intended parameters of workpiece hardness and cutter feeds and speeds, carbide cutting inserts provide long life to cutting tools and are very widely used throughout the industry. However, even with improvements to the matrix material, the bonding interface between the carbides and the matrix material, and the manufacturing processes, no carbide metal matrix composite materials have been developed that would be suitable for cutlery, and the material remains so brittle that its use must be carefully controlled to prevent shattering of the cutting instrument if the feed speed, cutter speed or the hardness or toughness of the workpiece exceeds the stress limitations of the carbide cutter.

Chipper and shredder blades, lawn mower blades, and brush cutter blades are notorious for their short blade life. These blades have high velocity and often encounter hard materials such as rocks and metal debris in their operation, so they must be made malleable. If they were made hard to retain a long blade life, they would be brittle and subject to catastrophic failure in the event of impact with a rock or the like which could shatter the blade or initiate a crack which could grow through the blade material and rupture at some unpredictable time in the near future. The malleable material does not crack or shatter like the harder material would, but it is also relatively soft and the blade edge quickly becomes rounded in ordinary use. The rounded edge cuts slower, requires more energy to cut, and cuts with a ragged edge rather than a clean edge, essentially breaking rather than cutting. In large chipping operations such as slash chipping in logging operations, the conventional chipper blades must be changed frequently, resulting in lengthy and inefficient downtime and idling of the operators. A blade material for machines of this nature that is hard and holds an edge, and is tough instead of brittle like conventional hard materials, would be extremely welcome to owners and operators of these machines. These same considerations also apply to machines such as stump grinders and road scarifying machines that are actually expected to involve contact with the ground or with rocks.

Many hand tools such as axes, splitting mauls and picks have the same malleability requirements that blades for chippers and shredders and that sort of machine have. The cutting or leading edge must be made malleable enough to yield or roll over on impact with a hard material so that it does not chip or break and produce flying metal fragments that would be dangerous to the user or bystanders, especially to their eyes.

Tools such as pruning shears, clippers, and saws, grafting knives, and chain saws used on green plants often get gummed up with plant sap that sticks tenaciously and is very difficult to clean off the tool. The sticky sap interferes with smooth cutting by the tool since it prevents the tool blade from sliding smoothly through the cut. The sap also promotes corrosion of the tool surfaces which makes even more difficult the task of cleaning the old sap off the tool. The corrosion around the tool cutting edges dulls the cutting edges and also gums up the sharpening tools.

Medical cutting instruments such as chisels, files, and scalpels currently in use are made primarily from 300 series stainless steels, primarily because of its corrosion resistance and tendency to bend rather than chip if the instrument encounters bone. However, the 300 series stainless steels are so soft that the instruments quickly become dull and must be replaced with sharp instruments. Scalpel sharpness is very important to a surgeon, and it is commonplace in lengthy operations for numerous scalpels to be used and discarded in the course of the operation.

In the 1960's, the Naval Ordnance Laboratory in White Oak, Md. invented an intermetallic compound of nickel and titanium which they named "Nitinol". One form of that material, which they named "Type 60 Nitinol", has a composition of 57–63% by weight nickel and the balance titanium. The Navy was interested in this material because it was nonmagnetic and potentially useful to the Navy Seal commandos in knives to defuse mines or cut anchoring cables on magnetic mines during the Vietnam war. The Navy had a small quantity of this material made and an experimental program was initiated to fashion it into knives for its Seal commandos, but the material proved to be so difficult to machine that the contractor was unable to produce more than a few prototypes and no further knives were made, despite the desirable attributes of the knife.

Thus, there has long been a need for a cutting instrument that is corrosion proof, hard, flexible, and tough, and can be polished to a high long lasting luster. This cutting instrument would have the ability to hold an edge for a long period, even in corrosive environments such as salt water and industrial chemicals, and it would be FDA approved for use in meat cutting and fish processing facilities, as well as in hospital operating rooms. High production rate processes for making such a knife at reasonable costs also have been long needed by the industry and, once adopted, will militate for the replacement of stainless steel by Type 60 Nitinol for all but the cheapest cutting instruments.

SUMMARY OF THE INVENTION

Accordingly, it is an object of this invention to provide improved processes for making a cutting instrument from Type 60 Nitinol. Another object of this invention is to provide an improved cutting instrument having a monolithic blade with a surface finish smoother than about 20 microinches and an edge hardness exceeding 55 on the Rockwell C scale. Yet another object of this invention is to provide a cutting instrument that is immune to corrosion from common corrosive agents, including ocean saltwater.

These and other objects are attained in a cutting instrument having a blade made from a blank cut from a plate or strip of Type 60 Nitinol. The plate or strip, having a thickness of about 0.010"–0.500", is first sandblasted to remove hard oxides that form during hot rolling of the plate. The blade blank is cut out of the plate using a laser cutter, abrasive waterjet or wire electron discharge machining. The blank is flattened to remove any curvature that may remain from the rolling operation, and is surface ground to a depth of about 0.001 to 0.005 inches top and bottom to remove surface imperfections in the plate. An edge is ground into the blade blank using a PCBN or diamond grinding wheel or belt and a liberal flooding of coolant to help capture the Nitinol particles. The surface of the blade can be polished to a lustrous surface finish, if desired, smoother than 2 microinches RMS, using a diamond grit abrasive polishing compound.

DESCRIPTION OF THE DRAWINGS

The invention and its many attendant objects and advantages will become more clear upon reading the following description of the preferred embodiments in conjunction with the following drawings, wherein:

FIG. 1 is a top plan view of a knife made in accordance with this invention;

FIG. 2 is a side elevation of the knife shown in FIG. 1;

FIG. 3 is a bottom plan view of the knife shown in FIG. 1;

FIG. 11 is a plan view of a second embodiment of a knife in accordance with this invention;

FIG. 12 is an exploded plan view of the knife shown in FIG. 11, showing the bolster, handle, butt piece and pin exploded away from the knife body and rotated 90°;

FIG. 16 is a schematic view of a laser welding apparatus for welding the bolster on the knife body shown in FIG. 12;

FIG. 17 is a schematic view of an electrical resistance welding apparatus for welding the bolster on the knife body shown in FIG. 12;

FIG. 26 is a plan view of the knife shown in FIG. 6 in a shipping and storage box with the cover removed;

FIG. 27 is an exploded sectional elevation of the knife shown in FIG. 26 and the shipping and storage box;

FIG. 28 is a plan view of a folder made in accordance with this invention, with the top handle slab removed for clarity of illustration;

FIG. 29 is a plan view of the folder shown in FIG. 28, with the knife blade folded into the handle;

DESCRIPTION OF THE PREFERRED EMBODIMENT

Figures 20, 21, 22, 23:
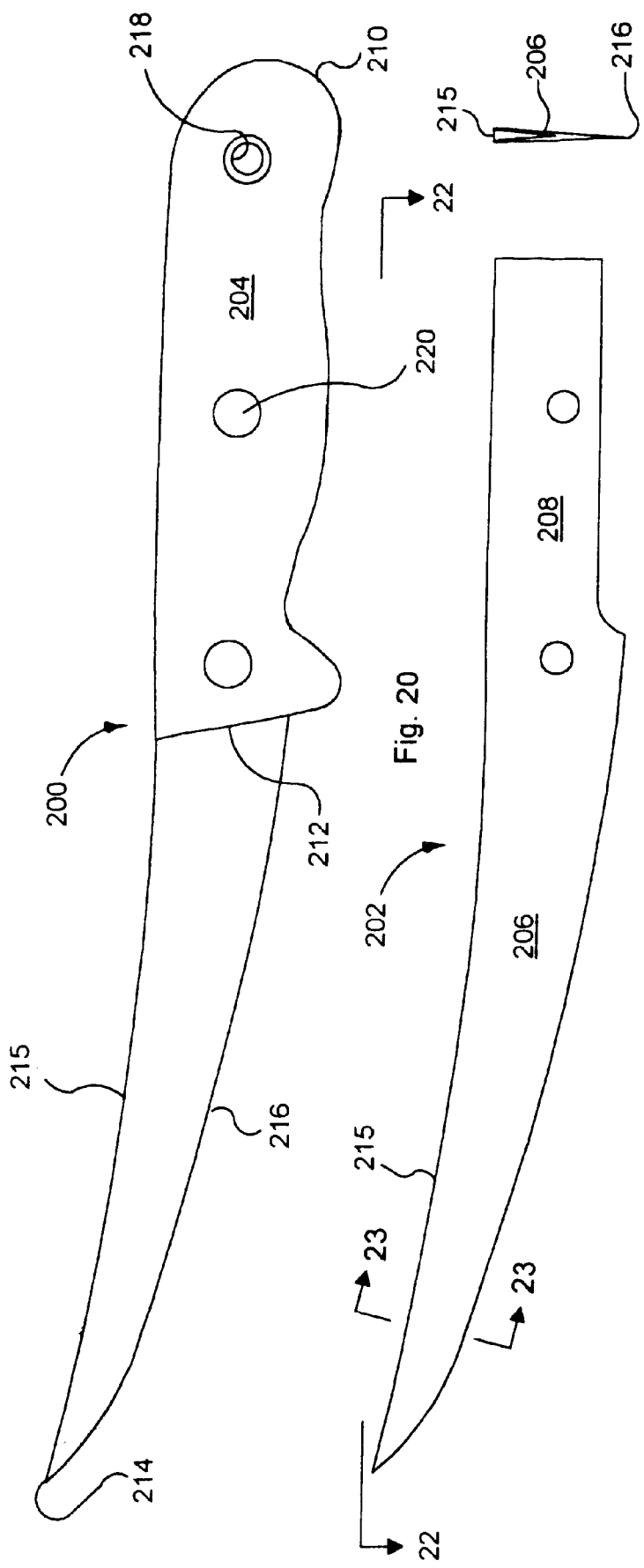
FIG. 20 is top plan view of a filet knife made in accordance with this invention.
FIG. 21 is a top plan view of the knife body of the filet knife shown in FIG. 20.
FIGS. 22 and 23 are side and end elevations of the knife shown in FIG. 20 along lines 22—22 and 23—23, respectively.

Turning now to the drawings, and more particularly to FIGS. 1–3 thereof, a knife 30 is shown in the form of what could be termed a "sport knife". The knife 30 has a knife body 32 including a blade 34 and a tang 36. The knife body 32 is made of a single piece of Type 60 Nitinol, an inter-metallic compound of about 60% nickel and about 40% titanium by weight that was invented in the 1960's by the Naval Ordnance Laboratory in White Oak, Md. A handle 38 is bonded to the tang 36 by an adhesive such as epoxy which seals the interface between the handle 38 and the tang 36; the handle is also secured to the tang 36 with rivets 40. The handle 38 of this embodiment is a scale or slab type handle having two slabs 42, one each secured to opposite sides of the full length tang 36. Other handle types are known in the art and can be used instead of this full tang scale handle 38, such as half tang scale handles, such as shown in FIG. 20, and full or partial tang one piece handles, shown in FIG. 12. The scale type handles are convenient because of the ease of making the handles of exotic hardwoods, such as bloodwood, bocote, zebra wood, or canary wood. Synthetic materials may be preferred in some applications where wood handles are undesirable or not permitted. Suitable synthetic materials for handle slabs include Zytel, a reinforced nylon, Delrin (made by GE Plastics), or Lexan, a polycarbonate also made by GE Plastics. The handle materials are selected on the basis of function and appearance. For example, the exotic hardwoods are beautiful, durable and hard, but may be susceptible to surface abrasion and other influences that could degrade the appearance of the handle, and governmental regulations restrict the types of handle materials that can be used in certain environments, such as meat cutting operations. In these situations, and in situations where the appearance of the knife is of less importance, a synthetic material handle would be preferable or necessary.

A series of serrations 44 may be ground along one edge 46 of the blade 34, producing sharp points 48 which are particularly effective in rapidly sawing through rope and other tough materials. The opposite edge 50, as shown in FIG. 1, is hollow ground and sharpened to a sharp straight edge, and the distal end of the blade is tapered and sharpened along both edges 46 and 50 to a sharp point 52. Alternatively, both edges 46 and 50 may be hollow ground to produce two straight sharp edges tapering symmetrically to a sharp point 52.

Figure 4:
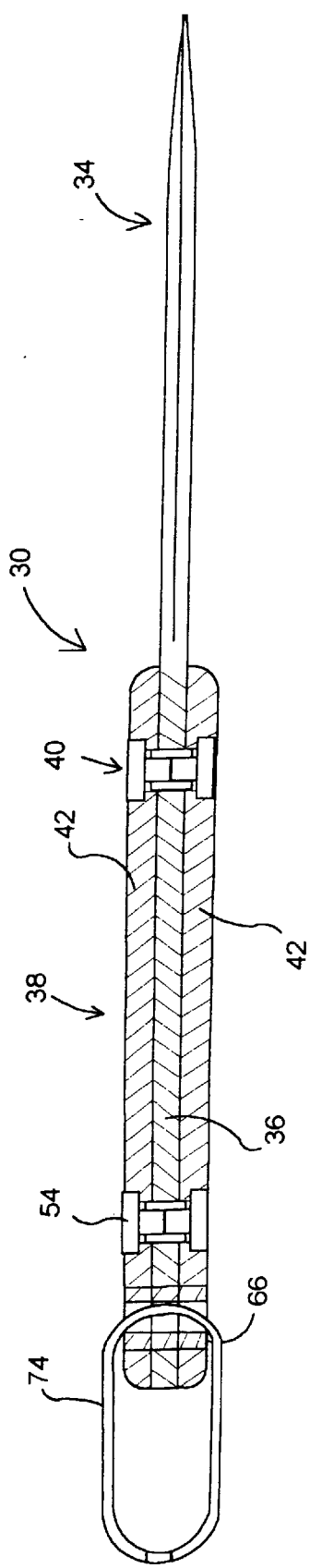
FIG. 4 is a sectional side elevation of the knife shown in FIG. 1 along lines 4—4 in FIG. 3.
Figure 5:
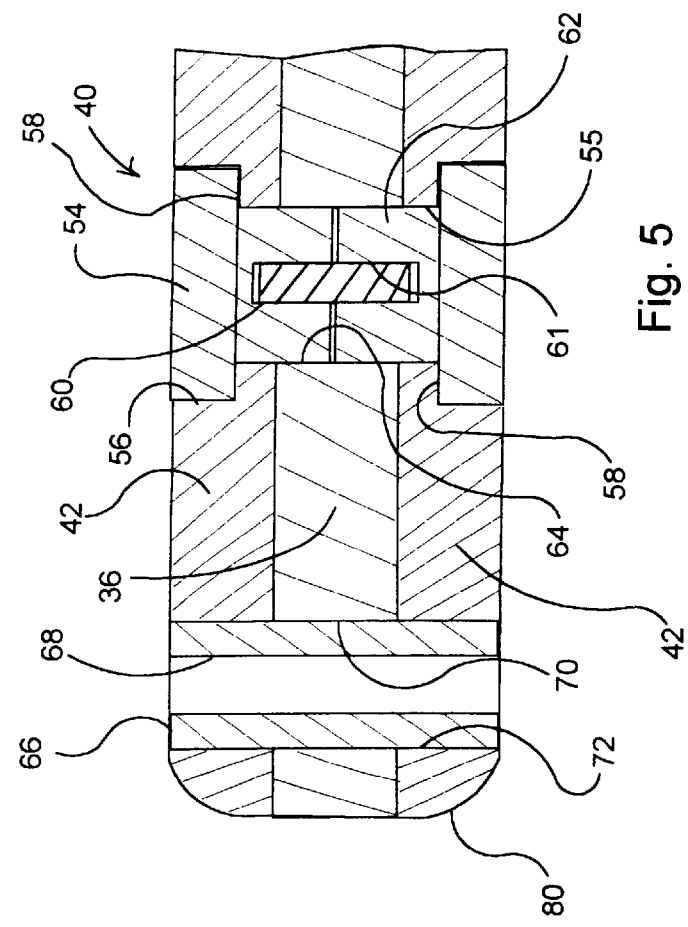
FIG. 5 is an enlarged sectional side elevation along lines 5—5 in FIG. 1.

Turning now to FIGS. 4 and 5, the attachment construction for the handle slabs 42 uses rivets 40 each having a head 54 that is flat on the top and bottom surfaces. The rivets are received in rivet holes 55 in the handle slabs 42, and the rivet heads 54 are received in counterbores 56 in the rivet holes 55, and seat against the shoulders 58 of the counterbores 56 to hold the slabs 42 against the tang 36. A roll pin 60 fits with an interference fit into an axial hole 61 drilled in shanks 62 of the rivets 40. The rivet shanks 62 are received with a sliding fit in a hole 64 through the tang 36.

Type 60 Nitinol is non-magnetic and is undetectable by magnetometers commonly used in airports and elsewhere to detect concealed weapons. For this reason, knives made for sale to the civilian market are made with stainless steel rivets 40 and steel roll pins 60, and may also have an iron or steel strip laid in a shallow recess on the inside surface of the handle slabs to make the knife detectable by magnetometers. Military knives would have handle slabs fastened with brass or Nitinol rivets using Nitinol roll pins to make them completely non-magnetic so that they could be used for probing for magnetic mines and the like.

Some knife users have a need for a lanyard by which the knife may be secured to their wrist or a harness or the like. Underwater divers, workers in elevated exposed places, fishermen or the like working in locations wherein the knife would be a hazard or would be lost if it were accidentally dropped often have a requirement for such a lanyard. For this purpose, a lanyard bushing 66 with a through bore 68 is driven with an interference fit into a hole 70 through the tang 36 and aligned holes 72 through the handle slabs 38. The bushing 66 is flush at its two ends with the surface of the slabs 42 and the bore 68 is chamfered at its two ends to prevent cutting the lanyard or ring 74 received in the bushing 66. The lanyard or ring 74 provides a secure attachment by which the knife 30 may be secured against loss as desired by the users of the knives.

The design of the handle 38 is selected for secure and comfortable gripping, even in wet or slippery conditions such as skinning and dressing game or gutting fish. As shown in FIGS. 1–3, the handle has a butt end 80 which is smoothly rounded in plan profile with a radius of about one half the width of the handle, preferably about 1.2 inches. The length of the handle is about 4.2 inches so that the smooth round butt 80 comfortably engages the heel of the average size hand when the knife is held in a natural holding manner. Forward of the butt 80, the handle tapers slightly and then flares at the handle midpoint to a bulge 82 which naturally fits the hollow of the palm. Forward of the bulge 82, the handle again tapers and then flares to the full width of the handle at a thumb ridge 84 adjacent the junction line of the handle 38 and the blade 34. The front edge 85 of each handle slab 42 describes a convex curve linking the front edges of the thumb ridges on both edges of the knife 30 Several parallel grooves 86 may be cut laterally across the edge of the handle in the concave flaring surface just to the rear of the thumb ridge 84. The concave surface in which the grooves 86 are cut is naturally engaged by the user's thumb when cutting, and improves the user's grip on the handle. The grooves 86 are also engaged by a latch 88 on one form of scabbard to hold the knife 30 in the scabbard when the knife 30 is fully inserted in the scabbard, as described in below conjunction with FIGS. 6–10.

Figure 6:
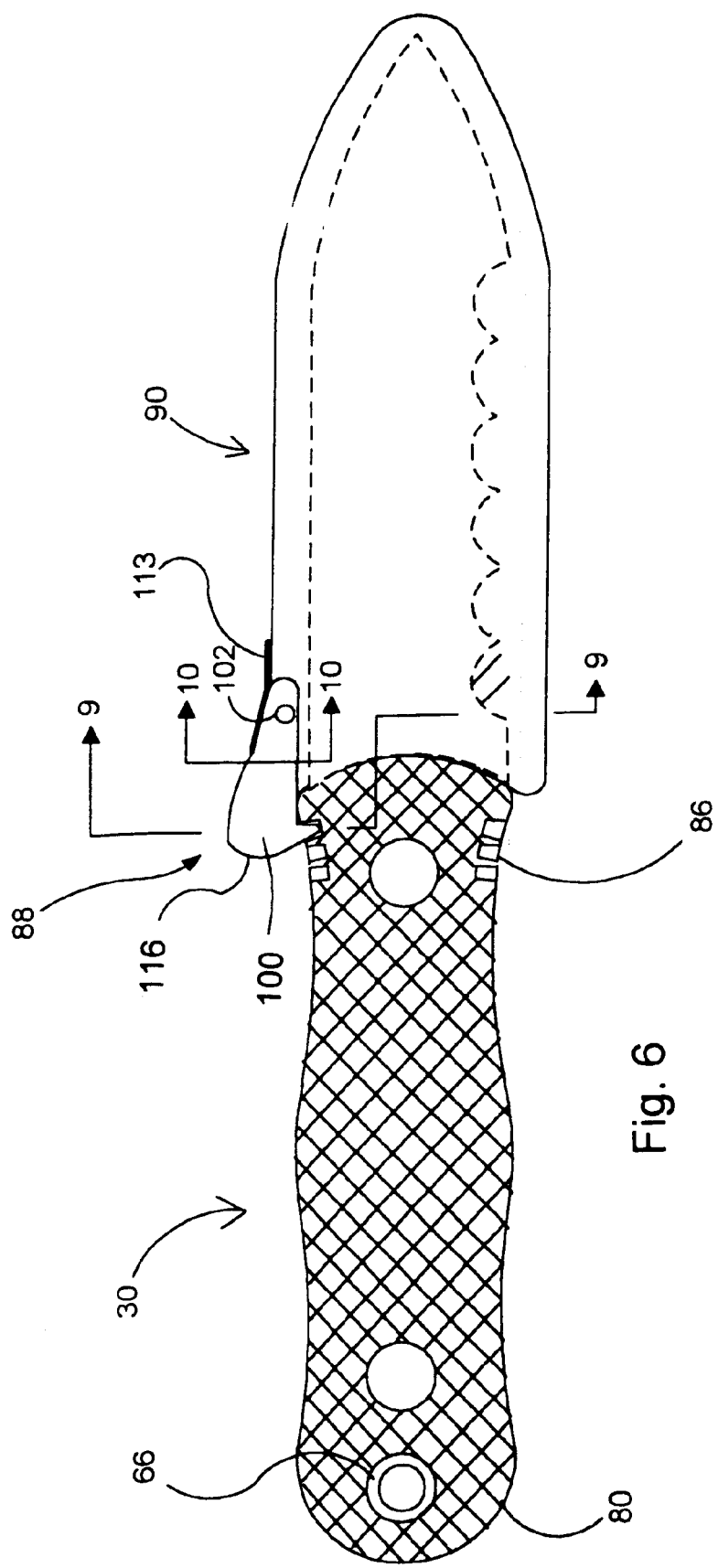
FIG. 6 is a plan view of a knife like the one shown in FIG. 1, having a knurled handle and a latching scabbard.

The handle slabs 42 can be knurled on their plane surfaces for improved grip as shown in FIG. 6, especially handle slabs 42 made of Delrin or other synthetic material which tends to be more slippery than wood. The knurling can be applied by internal ridges on an injection molding die, or for lower volume production, can be cut rapidly with a CNC engraving cutter which can also cut the rounded bevel around the edges of the handle slabs 42.

Figure 7:
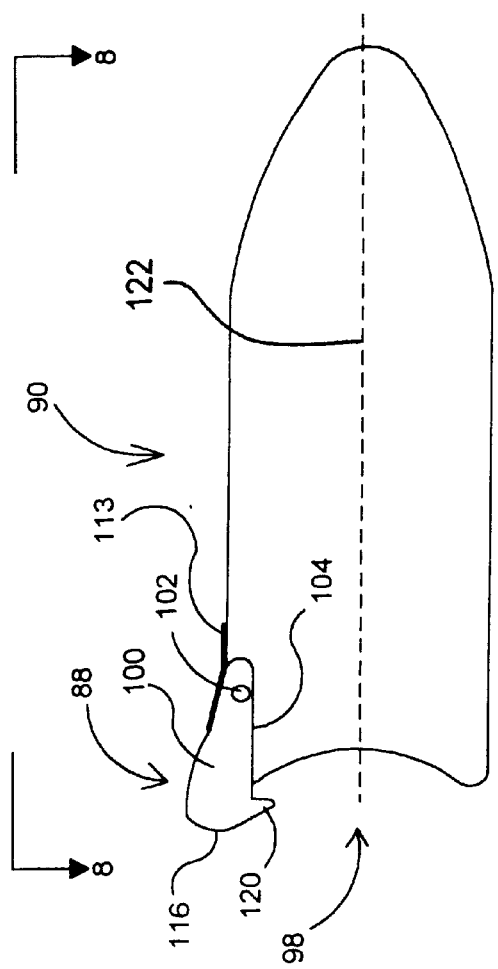
FIG. 7 is a plan view of the scabbard shown in FIG. 6.
Figure 8:
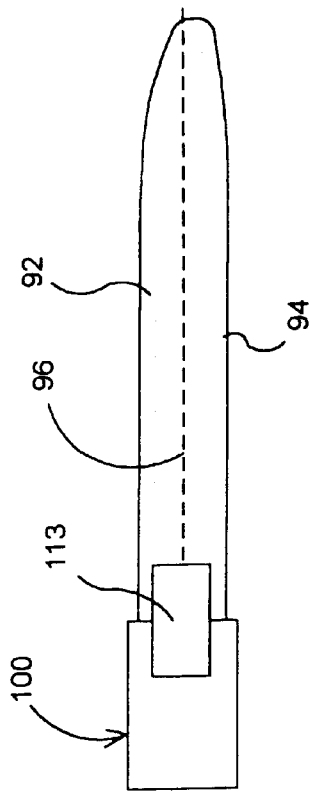
FIG. 8 is a side elevation along lines 8—8 in FIG. 7.

As shown in FIGS. 6–8, a latching scabbard 90 for the knife 30 shown in FIG. 1 includes top and bottom clamshell halves 92 and 94 formed by injection molding or the like and solvent welded or fused along a waterline junction 96 shown as a broken line in FIG. 8 since it is not actually visible after joining. The open end 98 of the scabbard 90 is curved to match the curve of the forward end of the handle slabs 42.

Figure 9:
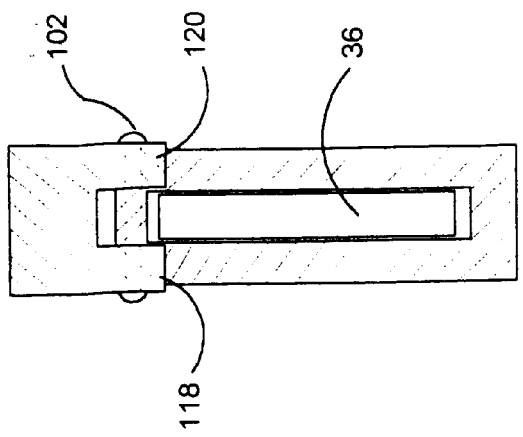
FIG. 9 is a sectional view along lines 9—9 in FIG. 6.
Figure 10:
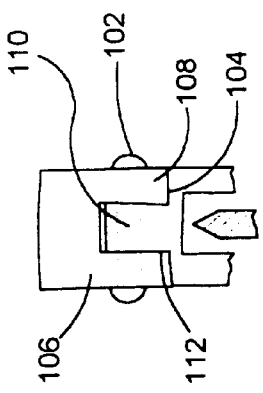
FIG. 10 is a sectional view along lines 10—10 in FIG. 6.

As shown in FIGS. 7–10, the latch 88 includes a latch body 100 pivotally connected to one edge of the scabbard 90 adjacent the open end 98 by a rivet 102. The latch body 100 is channel shaped along its inner edge 104, as shown in FIGS. 9 and 10, having spaced legs 106 and 108 that straddle a portion 110 of the scabbard edge that is reduced in thickness to provide recesses 112 that receive the legs 106 and 108. A leaf spring 113 biases the latch body against the edge of the scabbard 90. The leaf spring 113 is attached at its forward end to the edge of the scabbard 90 by fitting into an angled slot in the edge of the scabbard 90 and then is captured by fusing the scabbard material through small openings in the end of the spring 113. The rear end of the latch body 100 is widened to provide space for a thumb recess 116 by which the user may pivot the latch 100 body about the rivet 102 against the biasing force of the spring 113 to unlatch the knife 30.

Two depending teeth 118 and 120, shown in FIG. 9 project inwardly from the inner edges of the channel legs 106 and 108 at the rear end of the latch 100. The teeth 118 and 120 are shaped with a profile sloping inwardly and forwardly on their rear edges, and perpendicular to the centerline 122 of the scabbard 90 on their forward surfaces. This shape facilitates latching of the knife 30 in the scabbard 90 when the knife blade 34 is inserted into the open end 98 of the scabbard 90 and the curved front edge 85 of the handle slabs 42 and the thumb ridge 84 cams the sloping rear surface of the teeth 118 and 120 to pivot the latch body 100 outward about the rivet 102 against the biasing force of the leaf spring 113. When the blade 34 is inserted fully into the scabbard 90 with the curved front edge 85 of the handle slabs 42 engaged with the curved open end 98 of the scabbard, the front one of the grooves 86 registers with the teeth 118 and 120, and the biasing force of the leaf spring 113 rotates the latch 100 so the teeth 118 and 120 drop into the groove 86 to hold the knife 30 in the scabbard 90. The knife 30 may be withdrawn from the scabbard 90 by engaging the recess 116 with the thumb and rotating the latch 100 to lift the teeth 118 and 120 out of the groove 86 while sliding the knife 30 out of the scabbard. Alternatively a molded sheath may be used which is sized to fit the knife with a tight snug fit to hold it securely in the sheath.

Turning now to FIGS. 11 and 12, a second embodiment of a knife in accordance with this invention is shown in the style of what is usually termed a "survival knife" 130. It includes a knife body 132 having a blade 134 and a tang 136, to which a handle 138 is fastened by rivets 140 through two spaced holes 141 in the tang 136. Preferably, the handle is injection molded in one piece with a rectangular cross-section axial passage therethrough for sliding onto the tang 136 and securing thereon by a stainless steel butt piece 142. Alternatively, the handle could be made in two mating slabs 144 with a central axial rectangular recess into which the tang 136 fits snugly. The slabs can be solvent welded, ultrasonically welded, induction welded or the like to seal the slabs along a junction line 143 where they meet on the top and bottom sides of the tang 136.

The rear end of the tang 136 fits into a blind mortise 145 in the butt piece 142, and a pin 146 extends through a hole 148 in the rear end of the tang 136 and through a hole 150 in the butt piece 142 to hold the butt piece in place on the tang 136. The pin 148 could be a stainless steel pin driven with an interference fit through the aligned holes 150 and 148, or preferably is a memory metal pin, such as 55 Nitinol which is a nickel-titanium intermetallic compound having about 55% nickel and the balance titanium. The pin is sized slightly larger than the holes 148 and 150 and is pseudo-plastically elongated while in its Martensitic state to make it longer and thinner. The stretched pin 148 is inserted into the aligned holes 148 and 150 and heated above its transition temperature, whereupon the pin reverts to its original shorter thicker shape which permanently locks it in place in the holes 148 and 150 with an interference fit. The handle 144 can be made slightly too long so that the hole 148 is positioned slightly forward of the hole 150, so that when the pin 146 is driven into the holes 148 and 150, or the memory metal pin recovers its memory shape, it will force the butt piece 142 forward against the handle to create a tight fit of the handle 144 between the butt piece 142 and a bolster 154 described below.

The bolster 154 is attached to the knife body 132 in a groove 156 at the junction of the tang 132 and the blade 134. The bolster 154, shown exploded away from the knife body 132 in FIG. 12, is a rectangular plate made of 55 Nitinol having a rectangular opening 158 sized slightly smaller than the groove 156. The tang 136 can be flared slightly from the butt end 160 toward the groove 156, with the width of the butt end 160 sized to be received in the rectangular opening 158. The bolster 154 is slid forward on the tang 136, stretching and pseudoplastically deforming the portion of the bolster 154 on both sides of the rectangular opening 158 by about 6%. When the bolster is in the groove 156, it is heated to a temperature above its transition temperature, causing it to spontaneously revert back toward its pre-deformed size. Since the groove width is slightly greater than the original size of the opening 158, the bolster 154 is slightly strained in tension in the groove 156, causing it to be very tight in the groove 156. If it is not convenient to grind or cut the tang with a taper toward the butt end 160, the bolster can be pseudoplastically deformed on a separate fixture and then slipped over the tang 136 for heating and restoring to its original shape.

Figure 13:
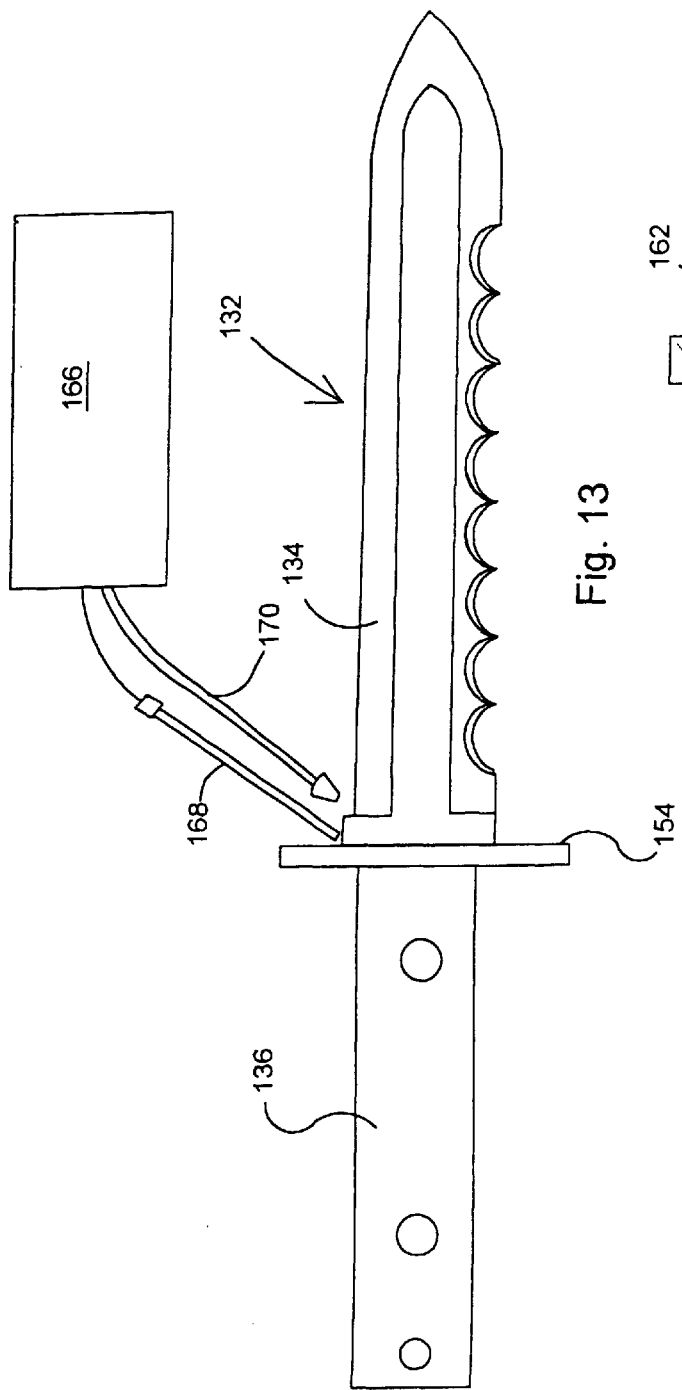
FIG. 13 is a schematic view of a tungsten inert gas welding apparatus for TIG welding the bolster on the knife body shown in FIG. 12.
Figure 14:
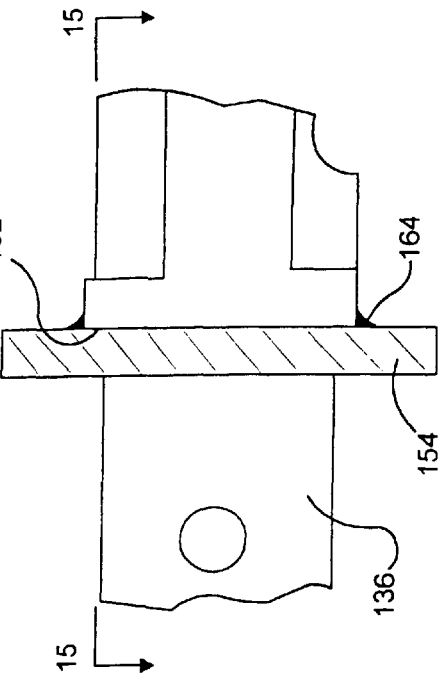
FIG. 14 is an enlarged view, partly in section, of the knife body shown in FIG. 13, showing the bolster welded in place.
Figure 15:
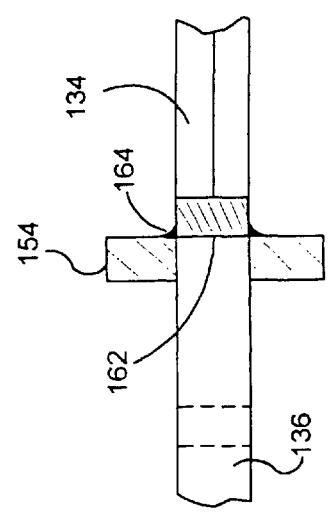
FIG. 15 is a view along lines 15—15 in FIG. 14.

Three other methods for attaching the bolster 154 are shown in FIGS. 13–15. In all of these methods, there is no groove 156; instead, the tang 136 is straight its whole length and has a width equal to the length of the rectangular opening 158 so the bolster slides onto the tang 136 and abuts a shoulder 162 at the junction of the tang 136 and the blade 134. At the position against the shoulder 162, the bolster 154 can be fusion welded by tungsten-inert gas welding as illustrated in FIG. 13, using a filler rod of Type 60 Nitinol to create a weldment 164 between the knife body 132 and the bolster around the opening 158 as shown in FIGS. 14 and 15. The TIG welding uses a power supply 166 that produces high amperage, high frequency current which is conducted through a tungsten rod 168 to produce an electric arc that is blanketed in a protective curtain of inert gas, such as a mixture of helium and argon supplied through a separate tube 170 or, more typically, through a concentric tube around the tungsten rod 168.

The weldment 164 is ground smooth with a radiused grinding wheel (not shown) coated with cubic boron nitride which is an effective abrasive for grinding Type 60 Nitinol. Diamond grinding wheels will grind Type 60 Nitinol also, but the diamond pattern on the grinding wheel or belt should be random rather than ordered, to prevent the establishment of fixed grooves cut by aligned rows of diamond particles on the wheel or belt, which produces peculiar surface finishes.

Two other techniques for welding the bolster to the knife body 132 are shown schematically in FIGS. 16 and 17. A laser, such as a $CO_2$ laser with a 2.5" focal length focusing optic system 176 and a laser generator 178 producing about 650 watts continuous wave, produced by Coherent Energy Corp. in Sturbridge, Mass. produces a smooth solid weldment that needs little touch-up grinding in the finished knife.

In FIG. 17, an electrical resistance welding technique is illustrated schematically using a power supply 180 for producing a high amperage current conducted through a cable 182 to a clip 184 attached to the bolster 154. The power supply is current controlled to maintain a constant current despite changes to the resistivity of the Nitinol bolster as its temperature changes. In this electrical resistance welding technique, the central opening 158 in the bolster is slightly undersized so there is intimate contact under compression at the interface between the bolster 154 at the inner edges of the opening 158 and the tang 136 so that a fused joint is created when the material at the interface melts under the influence of the electrical current flowing from the bolster to the knife body and thence to a ground line 186. To reduce the amount of Nitinol used in the knife, the tang 135 shown in FIG. 12 may alternatively be a partial or full tang extension of titanium welded onto the knife tang at the groove 156 or, preferably, further back on the tang 136, and embedded in the handle 144.

Figures 18, 19:
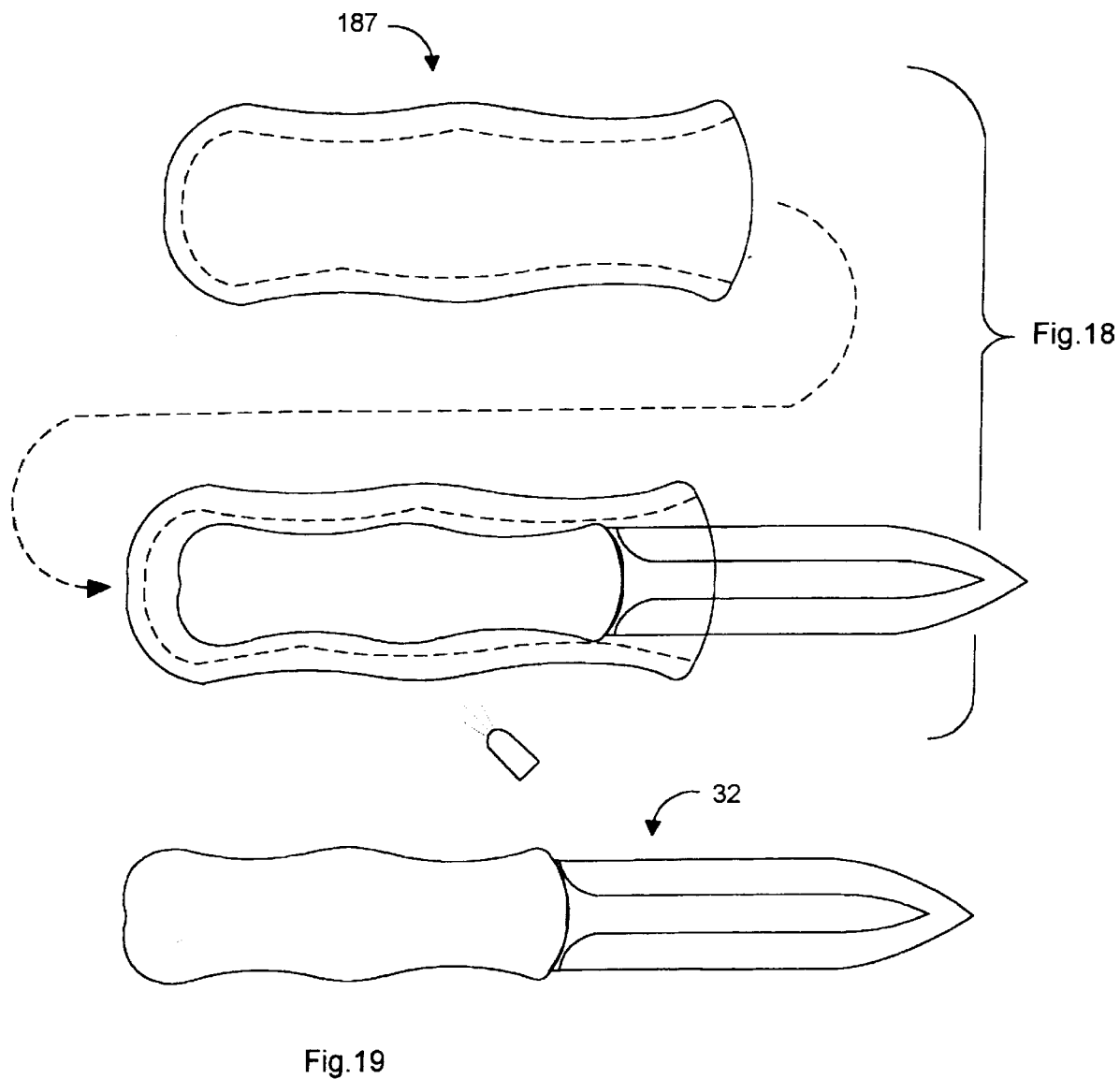
FIG. 18 is an exploded view of a heat shrinkable handle for the knife shown in FIG. 1.
FIG. 19 is a plan view of an assembled knife made from the knife body and handle shown exploded in FIG. 18.

Instead of the handle slabs 42 or the one piece molded handle 144, a different type of handle may be attached to the knife tang, as shown in FIGS. 18 and 19 by shrinking a handle form 187 molded of a heat-shrinkable material onto the tang 36. The handle form 187 is sized to slip onto the knife tang 36 of the knife body 32 shown in FIGS. 18 and 19 after grinding and polishing, and to be heat shrunk onto the tang, locking into the curvilinear indentations in the edge of the tang 36 when it shrinks. A variety of materials are available for this use, including semirigid and flexible polyolefins, from several suppliers, including Raychem in Menlo Park, Calif.

Turning now to FIGS. 20–23, a filet knife 200 made in accordance with this invention is shown having a knife body 202 and a single piece handle 204. The knife body 202 has a double wedge-cut blade 206 and a half length tang 208. The one piece handle has a rounded butt end 210 and an opposite inner end 212 into which an axial slot is routed to receive the tang 208.

The double wedge cut of the blade 206 is ground using the same grinding equipment disclosed above. The blade is ground to a taper from the root of the blade adjacent the position of the inner end of the handle 204 to a sharp point at the tip 214, and is ground to a taper from the back 215 to the cutting edge 216. The blade thickness at the back 215 of the blade at the root is about 0.070" and tapers uniformly toward the tip 214. This produces a slender blade that has increasing flexibility toward the tip 214 which facilitates meat cutting close to the bone and is an optimal size for gutting fish. The tip is very sharp and the blade near the tip is very sharp for penetrating through the hard scales of the fish, and stays sharp. The slender blade is about at least 5"-7" long to reach deep into the fish. The handle is a textured or knurled synthetic material such as Delrin, or can be Rosewood which is a close grained, non-slip wood that stands up well to water, especially if treated occasionally with linseed oil or food grade mineral oil. A particularly hard, tough and beautiful variety of rosewood is a West African Rosewood called Bubingia. The butt end of the handle has a lanyard hole 218 by which fishermen in boats can secure the knife against loss overboard.

The handle 204 is secured to the tang 208 with rivets 220 like the rivets 40 used in the sport knife 30 shown in FIG. 1. The same adhesive/sealant is used to seal and adhere the tang in the handle slot and to seal the rivet heads in the handle counterbores, as described previously in connection with FIGS. 4 and 5.

Figure 24:
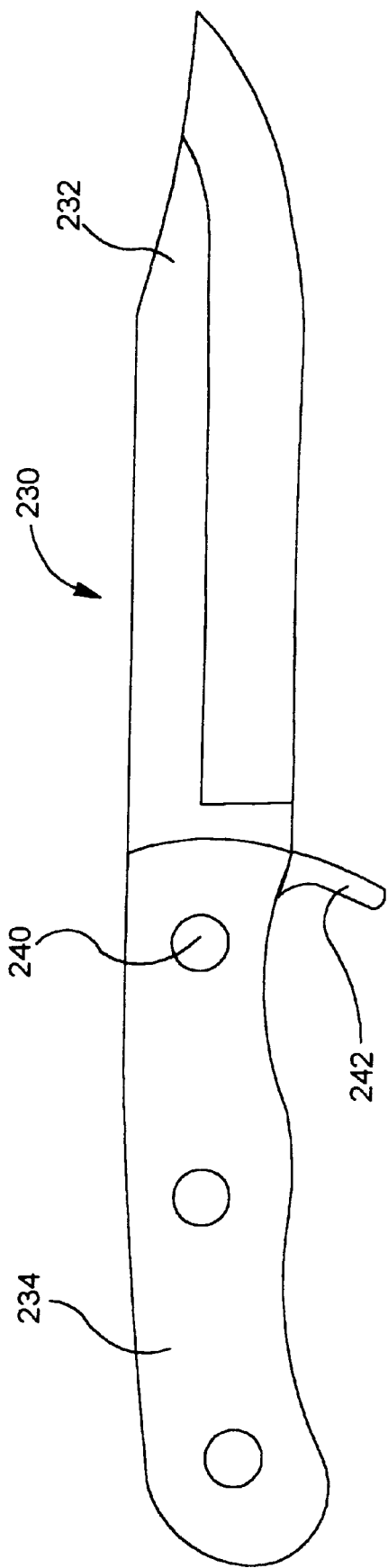
FIG. 24 is a top plan view of a hunting knife, with an integral finger bolster, made in accordance with this invention.
Figure 25:
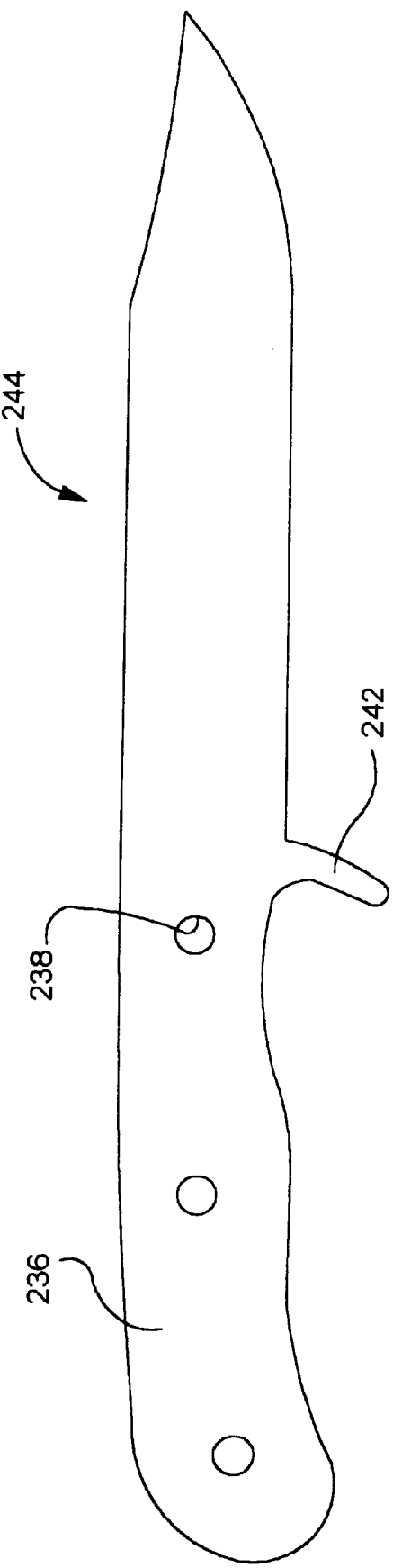
FIG. 25 is a top plan view of the knife body of the knife shown in FIG. 24.

A hunting knife 230 made in accordance with this invention is shown in FIGS. 24 and 25 having a drop-point blade 232 and a pair of slab handles 234 secured to a tang 236 through holes 238 in the tang 236 with adhesive/sealant and rivets 240 like the rivets 40 shown in FIGS. 4 and 5 in the sport knife 30. The hunting knife 230 has a husky 5" blade 232 about 11/32" thick and one inch wide for most of its length. It is very strong and can tolerate prying forces and impact from dropping or throwing that would break most knives at the bolster.

The knife 230 has a knife body 244 shown in FIG. 25 as it looks as laser cut from the plate 352. An integral finger bolster 242 depends from the knife body 244 at the junction of the blade 232 and the tang 233. The finger bolster 242 is about 5/32" wide and as thick as the knife body is, that is, about 11/32". In ordinary knife material such as stainless steel or carbon steel, a finger bolster of these dimensions would be so weak or brittle that it would soon be broken off in the normal rough handling that a hunting knife normally is subjected to. Type 60 Nitinol that is thermally conditioned as described above is so strong and tough that it has proven to survive impacts and other forces far in excess of what a knife would normally experience.

A storage and shipping box 250, shown in FIGS. 26 and 27 includes a box frame 252, a top 254 and a bottom 256. The box frame 252 is made from a slab of wood such as pine or mahogany that has a central cut-out 258 in the shape of the knife it is to hold, which is the sport knife 30 in FIG. 1. The cut-out 258 is slightly larger, but similar in shape to the outline of the knife. The cutout may be made with a simple scroll saw or, in high volume production, may be made with a CNC router.

The top and bottom pieces 254 and 256 are wood slabs about ⅛" thick made of pine or mahogany. The bottom piece 256 is bonded to the bottom of the box frame 252 with wood glue or epoxy, and the top piece 254 is screwed to the top of the box frame 252 by small wood screws 260 or is connected by a hinge (not shown) of known design. The hinge would be used for retail sales in stores where the customer would want to inspect the knife before leaving the store, and in situations where the customer would want to use the box to display his knife. The screws 260 could be used for catalogue sales. The box may be lined with velvet to convey a suitable aurora of quality.

A folder 305 having a blade 310 of Type 60 Nitinol is shown in FIGS. 28 and 29. The folder 305 has two handle slabs 312 (only one of which is shown) riveted to each other and to a butt piece 314 by rivets 316, and riveted to each other and to a lock bar 320 by a pivot rivet 325. The handle slabs 312 have aligned lunette recesses 327 adjacent the rear of the lock bar 320 which may be pressed to pivot about the pivot rivet 325 to unlock the blade. The lock bar 320 has a lug 330 on its front end, remote from the butt end, which engages a notch 335 on a rounded surface 336 at the root end of the blade 305. Engagement of the lug 330 in the notch 335 prevents the knife blade 310 from inadvertently folding onto the fingers of the user during use. The blade may be unlocked by pressing on the butt end of the lock bar 320 which pivots about the pivot rivet 325 to lift the lug 330 out of the notch 335 releasing the blade 310 to fold about a pivot pin 338 to its closed position shown in FIG. 37. A superelastic Nitinol spring 340 fitted into a slot 342 in the butt piece 314 biases the lock bar 320 to its locked position. A short screw 344 with a protruding solid screw head is threaded into a threaded hole along the spine of the blade to facilitate one-handed opening of the blade 310. The screw 344 may be removed and threaded into the hole from the other side of the blade for left-handed users. The hole in the Type 60 Nitinol blade may be threaded using the process described in my prior U.S. patent application Ser No. 08/349,872 entitled "Threaded Load Transferring Attachment", now U.S. Pat. No. 6,425,829.

The handle slabs 312 are made of titanium alloy such as the widely available 6-4 alloy, and each has a through hole drilled at its front end slightly smaller than the diameter of the pivot pin 338. A slightly larger hole 346 is drilled through the root end of the blade 310 for receiving the pivot pin 338 with a snug sliding fit. The pivot pin 338 is made of Type 60 Nitinol and is extremely strong, wear resistant and electro-chemically compatible with the blade 310 of the same material. The pivot pin 338 is pressed with an interference fit through the holes in the two handle slabs 312 and slides in the hole 346 in the blade root, securing the handle slabs to the blade and laterally supporting the blade root between the two titanium slabs 312. The tight sliding fit between the inside surfaces of the titanium handle slabs and the blade root provides long life bearing support for the blade against lateral loads, and the high strength and wear resistance of the pivot pin 338 ensures a long life free of looseness that conventional folders are often cursed with.

Processes

The processes of making the knives in accordance with this invention will now be described. The processes will be described with relation to the sport knife 30, but the same processes are applicable to any other knife design within the scope of this invention.

The knife body 32 is made from a knife blank 350 cut from a plate 352 or sheet of Type 60 Nitinol hot rolled to about 3/16 inch. Type 60 Nitinol is a very hard material even before heat treating, and is difficult to cut, drill and grind. Its hardness and corrosion resistance make it an ideal material for cutting instruments which, when made of materials such as carbon steel or 440C "stainless" steel conventionally used for cutting instruments, often rust or corrode first at the thin cutting edge and lose their sharpness in this way. However, the properties that make Type 60 Nitinol ideal for cutting instruments such as knives, also make it very difficult to cut, drill and grind.

Ingots of Type 60 Nitinol are made by mixing the powered nickel and titanium sponge and melting the composition in a crucible while thoroughly homogenizing the chemical composition by thermal treatment. The ingot is formed into a slab about 2" thick by hot forging. The forged slab is heated to about 850° C. to 900° C. and rolled in a rolling mill. Repeated passes through the rolling mill are necessary, with reheating of the slab when it cools below about 700–800° C. Type 60 Nitinol is described in Military Specification MIL-N-81191A and is available from Metaltex International Corp. in Albany, Oreg.

During rolling, the sheets or plate 352 develop an oxide surface layer that makes subsequent grinding operations slower and less efficient. This surface oxide layer may be removed by sandblasting the knife blanks, but it is preferable to sandblast the entire plate 352 with a garnet or other medium before cutting the blanks 350 out of the plate. Garnet is faster and does a more through job than sandblasting with sand.

Figure 30:
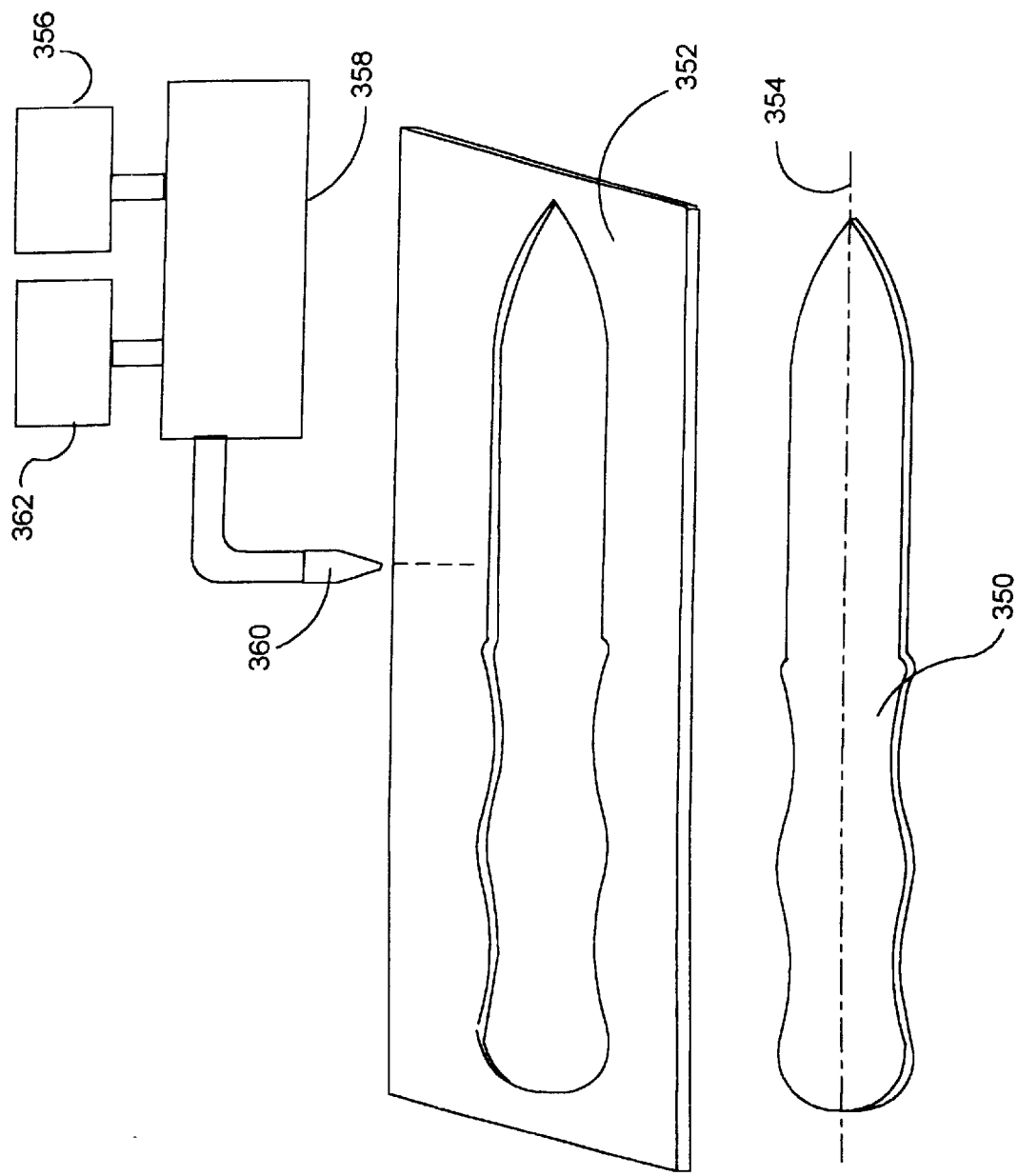
FIG. 30 is a schematic view of a waterjet apparatus for cutting knife blanks from a plate of Type 60 Nitinol.
Figure 31:
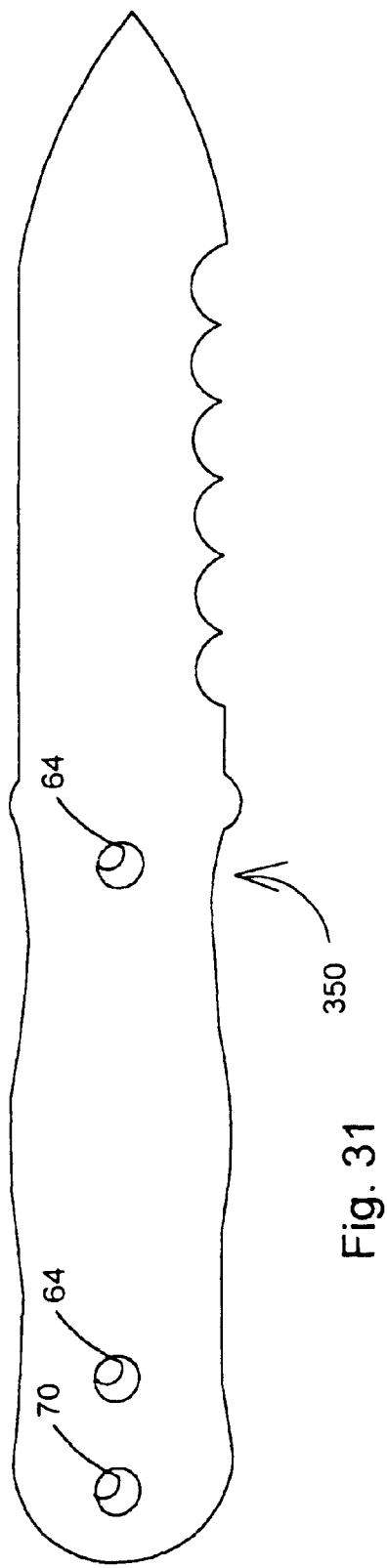
FIG. 31 is a plan view of a knife blank for the knife shown in FIG. 1.

Attempts to machine Type 60 Nitinol have usually proven unsuccessful, but I have discovered that it can be quickly cut using abrasive waterjet, illustrated schematically in FIG. 30. The sheet 352 is oriented with the direction of rolling parallel with the long axis 354 of the blank 350 to give the greatest strength along the long axis. Water from a reservoir 356 is pressurized to about 55,000 psi in a pump system 358 and directed through a nozzle 360 in a jet about 0.005–0.010 thick, entraining garnet abrasive particles injected from an abrasive injector 362, will cut Type 60 Nitinol 3/16 inch thick plate at about 18 inches/minute. The waterjet apparatus is available from Flow Industries in Kent, Wash. Preferably, the cutting is done under water to ensure capture of the Nitinol dust and to suppress sparking and fumes generated during cutting operations on Nitinol. The waterjet will cut several stacked plates, preferably with a rolling pressure foot that maintains the plates in contact at the cutting point. However, I prefer to cut the plates in a single thickness since the waterjet tends to diverge and produce a wider kerf as the distance from the nozzle increases. The nozzle movement apparatus is digitally controlled by an CNC controller, so the knife blanks 350, shown in FIGS. 30 and 31, can be cut automatically out of the Nitinol plate 352 once the pattern is programmed into the controller. The cutting operation is labor efficient and can be performed at night, so most of the costs of producing the blanks 350 are in the Nitinol material costs and cutting machine time. Although substantially more costly than 440C stainless steel, the superior functional characteristics of corrosion resistance, increased hardness and toughness, and 23% lighter weight provided by Type 60 Nitinol blades more than justify the increased cost.

The rivet holes 64 and the lanyard bushing hole 70 are also cut with the abrasive water jet. The hole 70 is an interference hole, so it is reamed after abrasive waterjet cutting with an abrasive reamer having cubic boron nitride particles adhered to its surface.

Another method for cutting the knife blanks 350 out of the plate 352 of Nitinol is wire electron discharge machining (EDM). Although this method is slower than waterjet cutting, it produces a smoother edge that reduces or may entirely eliminate the need for finish edge grinding of the tang 36. Wire EDM machines are available from several sources, including Mitsubishi EDM, MC Machinery Systems, Inc. and Hansvedt, Inc. commercially available from Perine Machine Tool Corporation in Portland, Oreg. in various forms.

A third and preferred technique for cutting the knife blanks 350 from the plate 352 is laser cutting. Laser cutting has proven to be an ideal technique for cutting blanks 350 out of the plate 352 because the laser kerf is very narrow and wastes only a tiny amount of material. The surface finish of the cut edges of the blank 350 is remarkably smooth and requires little or no finish grinding around the edge of the tang 36 before polishing the finished knife. The precision of the guidance apparatus which guides the material under the laser cutting head is so accurate that the holes 64 and 70 in the tang 36 can actually be used as coordination features to fixture the knife blank for edge grinding.

The laser apparatus used to cut the blanks 350 out of the plate 352 delivers a power of 2600 watts at the cutting point. A high pressure inert gas jet is directed at the cutting point to blow molten material out of the kerf. The laser apparatus is made by Trumph Manufacturing Company. When cutting Type 60 Nitinol plate about $3/16$ thick, a cutting speed of about 100 inches/minute or more can be maintained.

The high speed and excellent surface quality of the laser cutting is unexpected in view of the difficulty encountered using conventional processes to cut Type 60 Nitinol. I believe that the laser cutting works so well because of a combination of four factors: low thermal conductivity, low specific heat, low coefficient of thermal expansion, and the single phase nature of Type 60 Nitinol. The low thermal conductivity ensures that heat remains concentrated in the cutting zone instead of being conducted rapidly away as in more conductive materials, and the low specific heat ensure a rapid temperature increase at the cutting point, resulting in rapid melting of the material under the laser beam. The single phase material does not change its properties significantly as its temperature increases so it is very stable. The dimensions of the material are affected very little by the heat input by the laser because of the above factors and because of its low coefficient of thermal expansion, further enhancing its stability during laser cutting. Laser cutting of Type 60 Nitinol that uniquely combines all these factors is fast and produces smooth cuts of unparalleled speed, accuracy and precision.

The plate 352 as delivered from the rolling mill sometimes has a residual curve in the direction of the last rolling pass, usually the long direction. This curve must be removed from the blank 350 before surface grinding and edge grinding since otherwise the finished knife would have an objectionable curve out of its flat plane. It is possible to grind the blanks 350 flat, but it is difficult to mount a curved workpiece on a flat bed of a surface grinder, and grinding a curved blank 350 to make it flat is time consuming, costly and wastes material. A preferred technique for straightening a curved knife blank 350 is to heat it to about 800° C.–900° C. and then press the hot blank 350 against a flat surface, holding it there until it cools to room temperature. After cooling, the blank remains straight, with little or no springback. One simple method is to clamp the hot knife blank between the jaws of a vise. Care must be taken in handling hot knife blanks 350 of Type 60 Nitinol since the very low thermal conductivity of the material results in a long cool-down time for a hot knife blank. The knife blank 350 is about $3/16$ thick before surface grinding, so it cools much more slowly than a thinner blade, such as the filet knife blade shown in FIGS. 20–23.

The plate 352 as received from the rolling mill may be somewhat brittle because the rolling process may involve rapid quenching of the hot Nitinol by cool rollers. Rapid quenching of the Type 60 Nitinol can greatly increase the hardness of the material and reduce its malleability so that it becomes brittle as well as hard. A heat conditioning step reduces the hardness of the blank 350 to a more easily ground hardness of about 50–55 RC and increases the toughness of the blank 350 so that it is unbreakable by any kind of influence that a knife would normally be expected to encounter. The heat treating step is to heat the plate 352 or the knife blank 350 to a temperature of 600° C.–900° C. and allow it to cool slowly in air to room temperature. This simple process eliminates the internal stresses in the internal twinning boundaries that is believed to produce the greater hardness when the material is heated and then quenched quickly.

Figure 32:
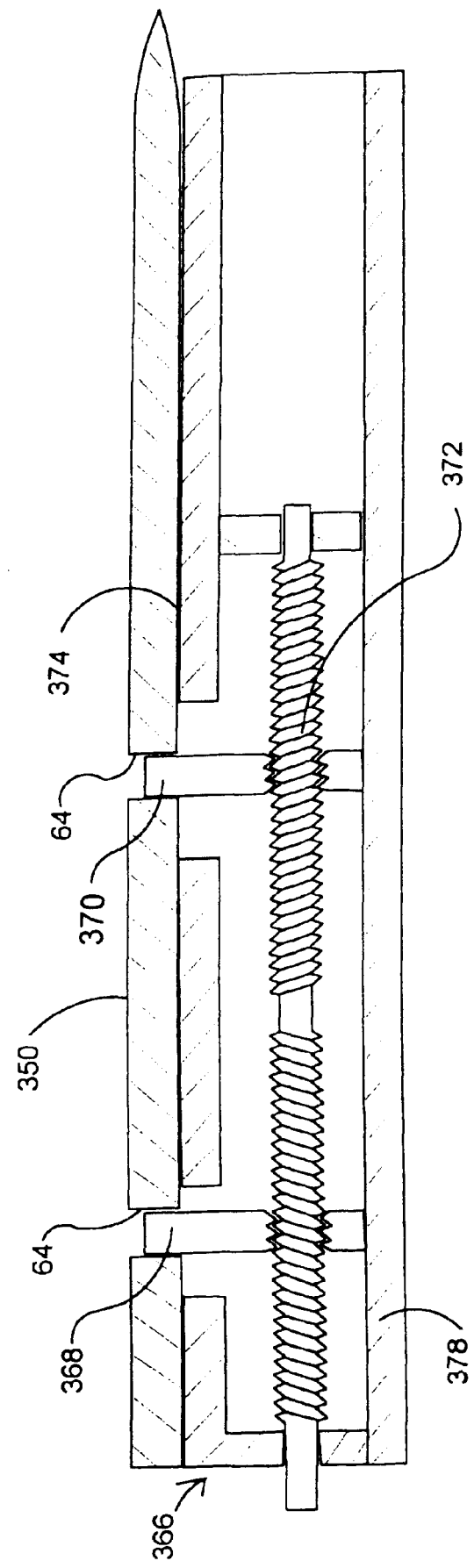
FIG. 32 is a sectional elevation of a holding jig for holding the knife blank shown in FIG. 31 for grinding.

Since Type 60 Nitinol is non-magnetic and cannot be magnetically attached to the bed of a surface grinder, an adapter 366, shown in FIG. 32, may be used to grip the blank 350. The adapter has a pair of stub pins 368 and 370 that can be moved toward or away from each other by a screw 372 having right handed threads on one end and left handed threads on the other end. The stub pins fit into the holes 64 in the knife blank 350 and are moved in opposite directions by rotation of the screw 372 to hold the knife blank 350 securely on the flat upper surface 374 adapter 366. The adapter 366 has a flat steel base plate 378 that is securely attached to the bed of a surface grinder by an electromagnetic holder on the grinder bed.

Surface grinding of the knife blank 350 removes surface blemishes and micro-cracks that may be created when the plate 352 is hot rolled, and reduces the thickness of the blade 34 to the desired thickness for that particular style knife. Boning knives and filet knives like the knife shown in FIGS. 20–23, for example, have thinner blades than general purpose hunting knives like the knife shown in FIG. 24, or the blade of the sport knife 30 shown in FIG. 1. Surface grinding can be performed by conventional grinding equipment, but the best abrasive I have found for grinding Type 60 Nitinol is diamond or polycrystalline cubic boron nitride (PCBN). The PCBN is preferred because it is much less expensive than the diamond and tends to be distributed in a random pattern on the grinding surface, whereas diamond is often distributed in an ordered pattern that produces peculiar patterns on the finished surface. A grinder that enables easy and convenient changing of the grinding surface for successive stages of increasingly finer mesh grit is the belt grinder. PCBN and diamond grinding belts are available from the 3M Company in Minneapolis, Minn.

Grinding of Type 60 Nitinol is fundamentally different from grinding conventional materials. Steel may be ground in a relatively soft condition before heat treating to the desired hardness, but Type 60 Nitinol is always hard. Moreover, it is best to avoid overheating the Type 60 Nitinol at the grinding face because at high temperatures, the material galls and the temperature increases rapidly, distorting the blank and shortening the life of the belt. More seriously, high surface temperatures produced by slow feed rates and deep cutting passes in conjunction with the use of cutting or cooling fluids can product microcracks in the ground edge of the knife. The low thermal conductivity of the Type 60 Nitinol makes it very difficult to remove the heat once the blank has gotten hot. The surface may be flooded with coolant to removing heat and lubricate the grinding face during grinding, but if coolant is used it is best to ensure that the surface temperature is not elevated above about 500° C. to prevent rapid quenching and resultant brittleness, which can result in microcracks at the cutting edge of the knife. The coolant bath also helps to trap the particles of Nitinol removed by grinding. To reduce the rate of heating and work input into the material during grinding, the surface grinding is performed by rotating a grinder having abrasive particles on a cutting surface of the grinder against the Nitinol workpiece at a surface speed of about 5000 to 7000 surface feet per minute and grinding with a very shallow depth of cut, about 0.001–0.005 inch, preferably 0.001–0.002 inch, and as high a feed rate as the material will tolerate. This cutting schedule prevents heat build-up and enables removal of heat in a spray of coolant and helps to trap the grinding dust removed from the parent material. The feed speed is slower than the grinding feed speed with conventional materials, on the order of about 50–120 inches/minute despite the shallow depth of cut because the material cuts so slowly, but should be as fast as possible to minimize the heat build-up in the knife edge. The coolant spray entrains the grinding dust, facilitating capture of the dust in the recirculating coolant and minimizing the health risk presented by Nitinol dust.

Figure 34:
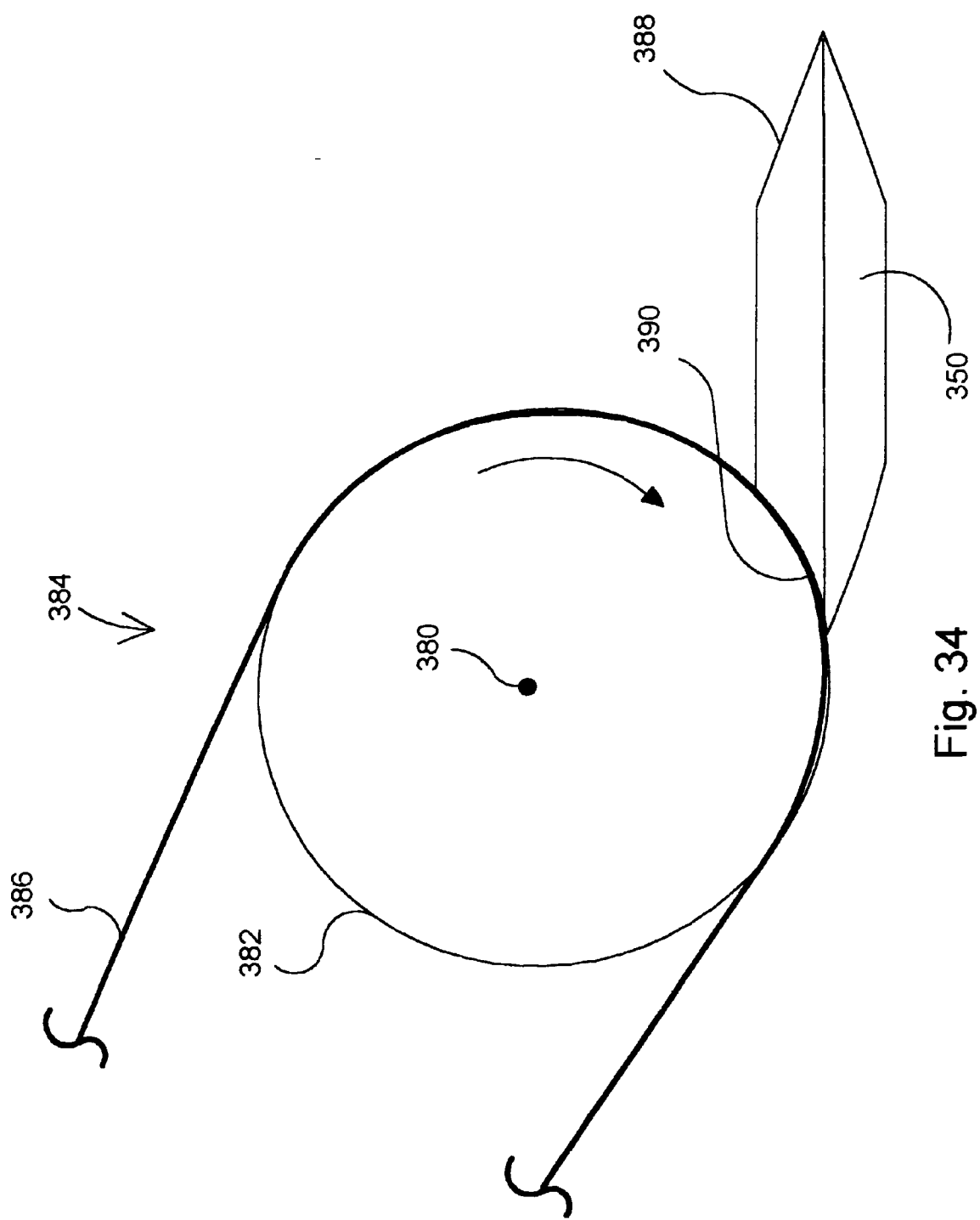
FIG. 34 is a schematic view of a belt grinder hollow grinding and edge onto the knife blank that was edge ground in FIG. 33.

After surface grinding, the edges are ground to a taper of about 5°–10° as illustrated in FIG. 21. These surfaces are ground by tilting the grinder or tilting one end of the knife blank 350 up about its longitudinal axis on a modified adapter 366' and passing the knife blank 350 lengthwise with the axis of the blank perpendicular to the rotational axis 380 of the grinding wheel or drum 382 of a belt grinder 384 so the belt 386 engages the surface on a tangent. This produces a flat edge surface 388 which can be sharpened directly. The blank can also be hollow ground, as illustrated in FIG. 34, by turning the blank 90° and tilting the axis of the blade slightly away from the axis 380 of the drum 382 so they are not exactly parallel. The blade is moved along the surface of the drum 382 while the belt or grinding wheel grinds the hollow or concave surface to produce a hollow ground edge 390.

Figure 33:
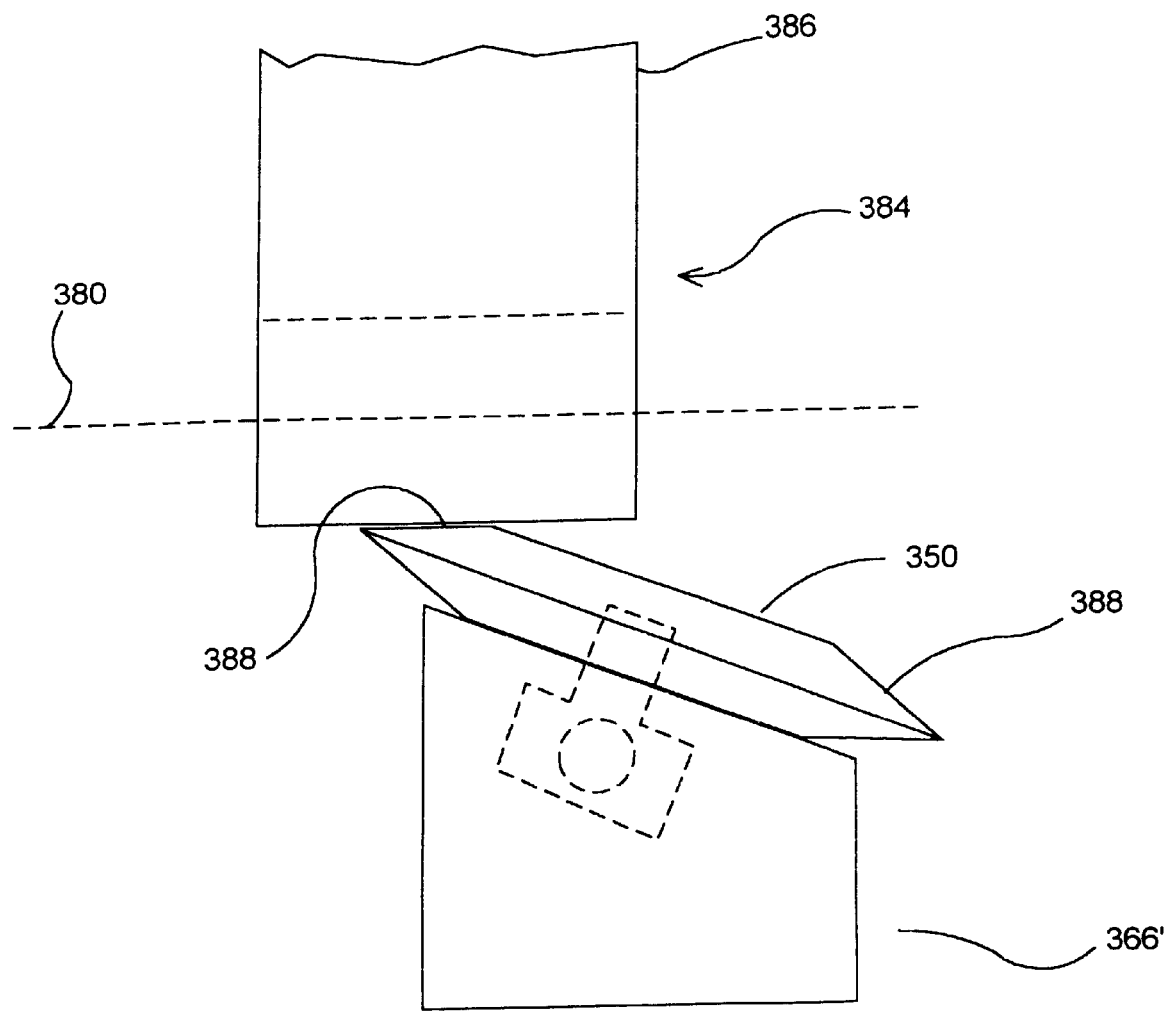
FIG. 33 is a schematic view of a belt grinding apparatus for grinding the edge of the knife blank shown in FIG. 31.
Figure 35:
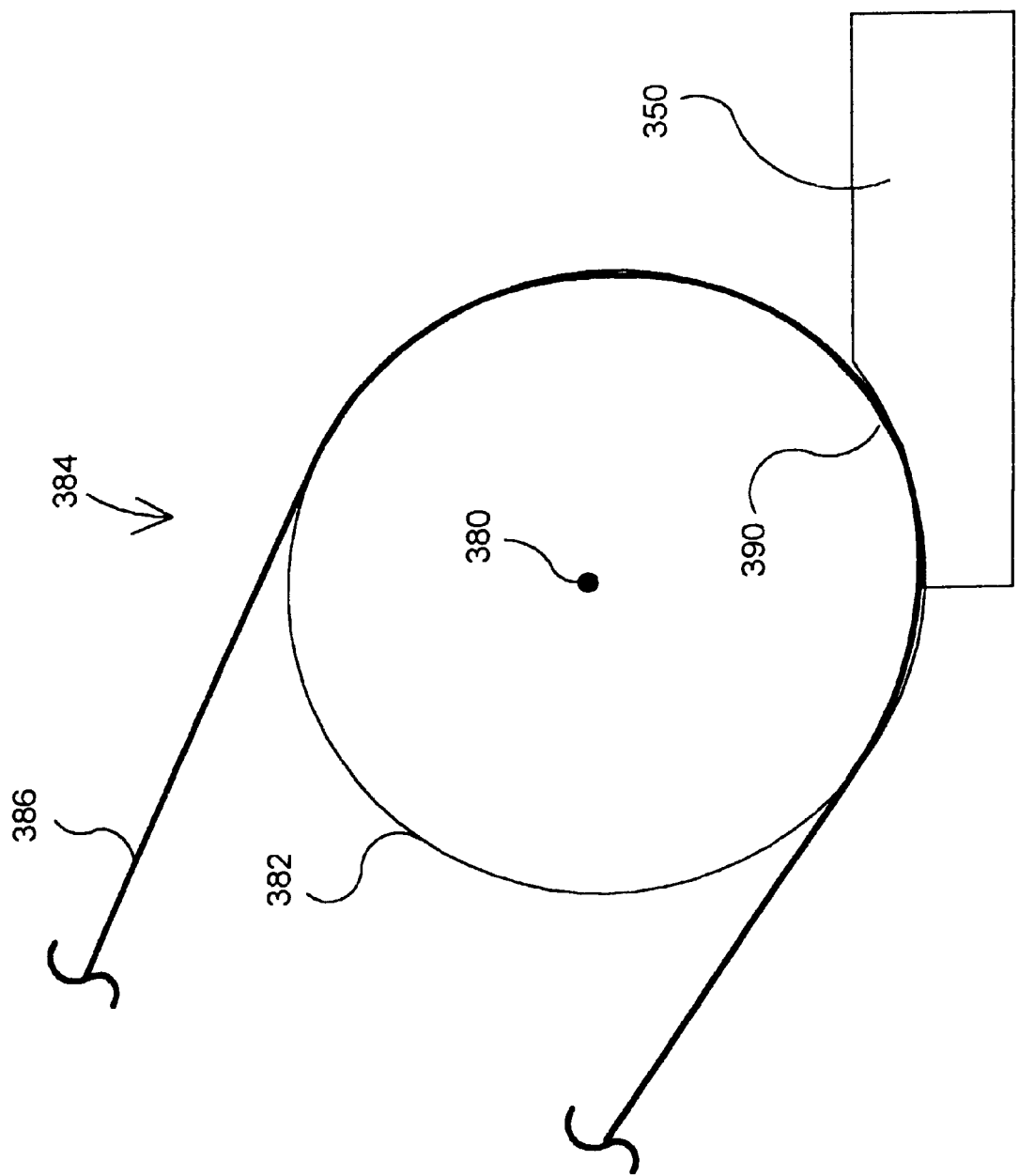
FIG. 35 is a schematic view of a belt grinder hollow grinding an edge directly without first grinding the edge flat as in FIG. 33.

The edge can be ground from the blank directly as shown in FIG. 35. The blade blank 350 is mounted on a modified adapter 366' (shown in FIG. 33) at the desired blade angle, and the axis 380 of the drum 382 or grinding wheel is tilted slightly away from the direction of elongation of the blade blank 350. The blade blank or the grinder 384 is moved parallel to the direction of elongation in a series of rapid shallow passes that remove 0.001–0.002 inch of material at each pass. The blank is flipped and rotated for grinding the other blade edge surfaces. A blade can be completely edge ground in about ten minutes in this way. The final pass can be with a belt 386 having a finer mesh grit size to produce a finer surface so that less work is needed during the polishing step.

Edge grinding and surface grinding can momentarily raise the surface temperature of the knife edge to a high temperature which is then quenched by the coolant spray, producing a heat treatment that raises at least a shallow surface layer to a high degree of hardness. The hardness is especially undesirable at the edge of the blade because, although it is very hard, it can chip if hit hard against an edge of a hard item such as a rock. Indeed, the Type 60 material in its as-rolled condition is so brittle that a knife blank can actually be broken by hand and can break if dropped on a concrete floor from about four feet. In the polishing operation, the knife body can be exposed to severe conditions of bending and is occasionally dropped or thrown by the buffing wheels. To prevent chipping or breakage caused by hitting or dropping the knife body while in this state of undesirable hardness/brittleness, it is desirable to heat treat the entire knife blade after grinding by heating it to about 400° C.–600° C. and allowing it to cool slowly in air to room temperature. An easy and reliable indication of reaching the proper heat treating temperature for this purpose is a change of color of the Type 60 Nitinol surface from silver to gold. The surface coloring process is discussed in detail below.

Blades with a long tapering tip are easily overheated with a torch and the thin material at the tip can cool very quickly in air, producing excessive brittleness in the tip. To prevent such knives from reaching the customer, I drop the knife tip first onto a concrete floor from about 4 feet. If the tip breaks, I merely regrind the tip of the blade to shape, taking care not to raise the temperature above about 500° C. to avoid the same problem from recurring.

The blade is now polished to a finish of about 20–10 micro-inches or finer, down as fine as 5–1 microinches. If the preceding grinding operation produced a blade finish that is too rough, it may be ground to a finer surface finish using a belt with a fine aluminum oxide abrasive, although it is preferable that the final pass in the grinding operation be performed with a fine grit grinding surface to minimize the polishing effort. A rough polishing operation follows, using Turkish emery glued to a buffing wheel with a suitable adhesive, such as horseshoe cement. A high power motor, on the order of 10 hp, removes surface material, including the gold surface material, producing a luminous plume of sparks. It is necessary to protect workers in the vicinity of the polishing operation from the sparks and the dust with capable exhaust and dust collection equipment. The final polishing is performed with a buffing wheel impregnated with a fine diamond polishing compound. A buffing compound that I have found to be particularly effective is Glaz Woch, available from Ralph Maltby in Newark, Ohio. Contrary to the usage suggestions of the distributor, the Glaz Woch is very effective for producing a mirror-like sheen on the polished Type 60 Nitinol blade using a buffing wheel driven at about 3000 RPM with a 10 HP motor and high buffing pressure. Other polishing compounds are available from 3M corporation in multiple mesh grades which, like the series of ever finer grit mesh on the grinding belts, may be applied in descending mesh size using a different buffing wheel for each different grit size. Other buffing compounds that also produce a fine finish are E5 Emery followed by SCR Stainless, produced by Dico Brothers Company in Utica, N.Y. The finish resulting from these polishing operations has an extremely attractive mirror-smooth appearance that is not degraded over time by stains, corrosion or tarnishing like the finish on conventional materials.

Ornamentation, logos, trademarks and other indicia can be permanently engraved into the blade 34 by an electrochemical process that flows direct current through a transfer medium on which the desired indicia is reproduced. The transfer medium, which allows the current flow only where the etching action is desired, is placed directly against the surface of the blade where the indicia is to be engraved and an acid soaked pad is laid over the transfer medium. A conductor connects the pad to a transformer, and a ground conductor grounds the blade back to the transformer. The blade surface and the transfer medium must be very clean and the ground conductor must be placed as close as possible to the engraving location since the electrical conductivity of Nitinol is low. The transformer is turned on to produce a DC current of about 5 amps, and the process is allowed to run for about 20 seconds. The current is then turned off and the pad and transfer medium are removed. The knife blade and transfer medium are rinsed in water to remove traces of acid and the engraving of that blade is complete. The etching is done before the surface treatment to be described immediately below because the surface material is non-conductive.

Figure 36:
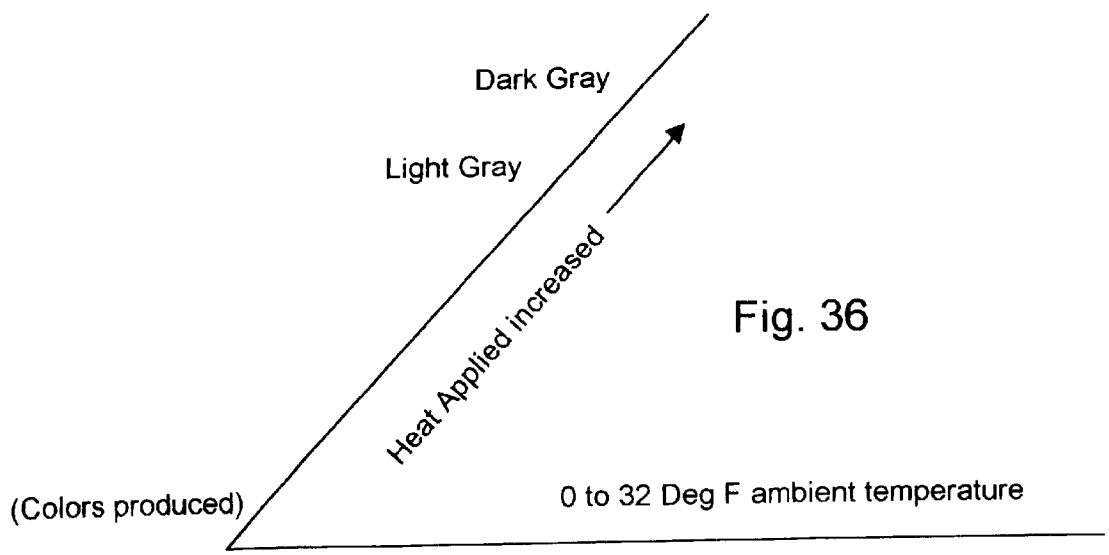
FIG. 36 is a diagram showing the heating process for forming a hard, slippery surface material on the Type 60 Nitinol article that is integral with the parent material.

The blade 34 can be processed to have a hard, non-stick, light or dark gray, chemically inert and electrically non-conductive surface. The process begins after the knife blade has been polished to as smooth a surface as is economically feasible. The smoother the finish is to start with, the better the finish will be after the surface conditioning process is done. As shown in FIG. 36 the process begins with heating the blade to an elevated temperature, believed to be about 600° C.–900° C. in air for about 2 minutes. I have found that it is necessary to heat the blade outdoors in cold air, at an ambient temperature of about 0–32° F. I have not determined why these conditions are necessary to produce the gray color, but I believe it may be related to the cooling rate or the difference in air constituents outdoors vs. indoors. Minor differences in $CO_2$, $O_2$, $N_2$ and water vapor concentrations indoors vs. outdoors may influence the reaction. I believe that the gray color of the surface material is a chemical reaction that produces oxides, nitrides, carbides or other compounds from the nickel-titanium intermetallic compound of the Type 60 Nitinol. Whatever the reaction is, if indeed it is a reaction, I produce it by heating the knife blade evenly with a MAPP gas torch until the gray color forms, and then remove the torch and allow the blade to cool naturally in air. The cooling occurs slowly because of the low thermal conductivity of Type 60 Nitinol, so I allow 30 minutes or more cooling time before the next step.

When cool, the blade is polished with a fine grit diamond buffing compound such as Glaz Woch mentioned previously, but is not subjected to the high power and high pressure buffing that produced the high gloss following the surface and edge grinding. A lighter pressure and lower power wheel, on the order of one HP, is necessary, otherwise the surface material could be polished off. After buffing, the blade will be a medium gray color and will have a smooth, shiny surface finish. The heat treatment is repeated to the same temperature and for about the same time period and conditions, and after cooling, is again polished with the same buffing steps. The process may be repeated several times to produce darker shades of gray and increasing luster of the surface.

The resulting surface is a lustrous dark gray and is so hard and slippery that it is virtually scratchproof and non-stick. It is chemically inert so it can be used in environments that would be extremely destructive to conventional knife materials. The surface is electrically non-conductive so its use around electrical equipment would provide an extra margin of safety to workers. For applications such as pruning shears, clippers, and saws, grafting knives, and chain saws that are used on green plants, the plant sap is easy to clean off the tool and the blade is so slippery that it slides smoothly through the plant being cut. The corrosion resistance ensures that the blade remains smooth and slippery and the edge remains unaffected by the sap that causes corrosion in prior art blade materials.

For military application in which a shiny knife blade is undesirable because of the glint that reflection from the sun or sky produces, a non-reflective matte finish can be produced by glass-blasting the blade surface before the surface conditioning process. Glass-blasting uses micron sized glass beads driven against the blade surface at high velocity to produce a smooth but matte or non-shiny finish. The finish is similar to that produced by sand-blasting with garnet, except that the surface irregularities on the glass-blasted surface are smaller than the garnet-blasted surface.

Figure 37:
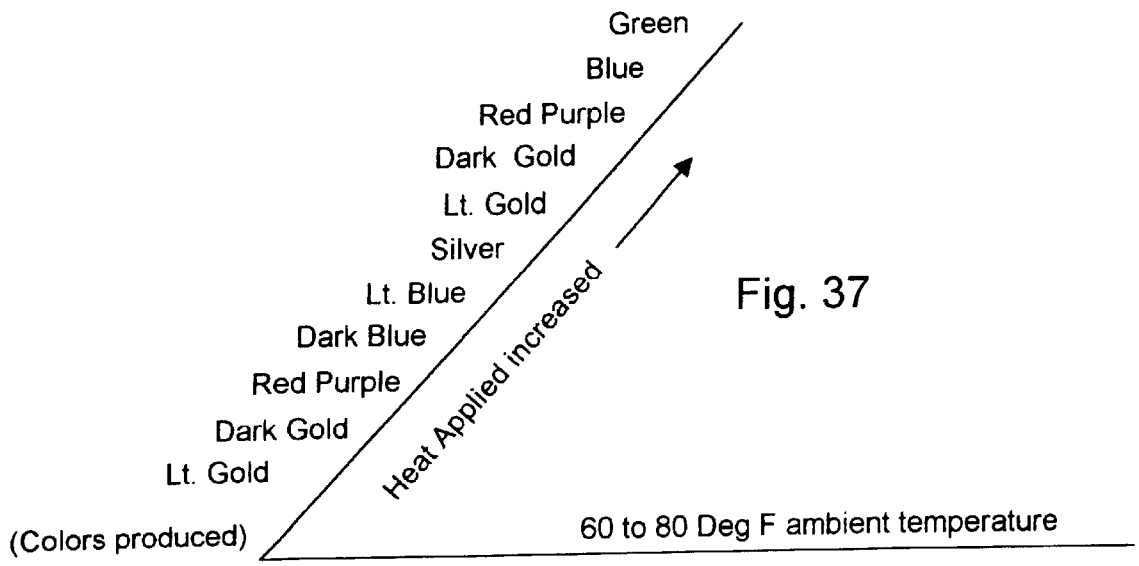
FIG. 37 is a diagram showing the spectrum of colors that can be obtained on the surface material of a Type 60 Nitinol article using a heating process in accordance with this invention.

A modification of the above surface conditioning process can be used to produce a similar surface, but with any of a spectrum of colors rather than gray. As shown in FIG. 37, the colors, gold, red/purple, blue, silver, and green may be obtained in the Type 60 Nitinol surface material, depending on the degree to which the Nitinol is heated. The process is similar to that used to achieve the gray surface material, but the process is performed indoors at room temperature, between 60° F. and 80° F. This process also starts with polishing the blade to as smooth and shiny a surface finish as is practicable, since a shiny finish is even more important to the appearance of a colored blade than it is to a black or gray blade. In fact, I have not found it to be possible to produce any colors other than gray on a glass-blasted blade surface; some degree of polishing is necessary to get the colors shown in FIG. 37. After polishing, the blade is meticulously cleaned to remove all traces of oil or other residue that could burn onto the blade at high temperature and leave marks in the colored surface. The blade is heated to a temperature at which the desired color appears on the surface of the blade. The colors begin to appear at a temperature in the range of about 400° C.–700° C. or 400° C.–650° C. As shown in FIG. 37, the colors appear and change as the temperature increases. Light gold is the first color to appear and, in order, the color changes to darker gold, red/purple, dark blue light blue, and then silver, but a lighter shade of sliver than the original shade of the polished Type 60 Nitinol material. If the temperature is raised even higher after the light silver color appears, the blade color again passes through the gold, red/purple and blue colors as before, but then goes to green. The temperature change required to pass through the second color spectrum after the light silver is a narrow temperature band and can happen so fast that it might not be noticed. It appears that third and fourth color spectrums with the same colors follow the second spectrum, and there may be more after the fourth, but the temperature difference becomes smaller between the spectrums so they are difficult to discern. After heating, the blade is allowed to air cool and may be buffed with a fine diamond grit such as the Glaz Woch material mentioned above. All of the surface materials have the same hard, slippery (non-stick), electrically non-conductive characteristics of the gray surface material discussed above.

Curiously, the indicia etched into the surface of the blade as described above does not take on the color that the blade surface assumes. I believe this may be the result of a rough surface formed by the electrochemical action of the etching process, but whatever the reason, the result is a remarkable enhancement of the readability of the indicia on the colored surface.

If the desired color is, say, dark blue and the blade is mistakenly heated to a temperature at which a subsequent color appears, it is possible to proceed through silver to the second spectrum to recreate the desired color. Doing so is more difficult because of the narrower temperature band within which color changes occur. In practice, it may be preferable to accept the silver color or polish off the surface material with a high power buffing wheel impregnated with diamond buffing compound and repeat the heating process.

The colored blade surface materials I have produced are with the use of a hand-held torch, applied judiciously to obtain the desired color. However, I anticipate that mass production of knives to produce these desirable surface materials would be done in an electric furnace wherein temperature and atmospheric conditions could be precisely controlled. The knife tang could be mounted in a holding fixture which would be moved through a pass-through furnace in which the necessary atmosphere would be maintained and the temperature would be raised to that necessary to produce the desired surface material. The fixture would then be moved out the other end of the furnace and the knives would be air cooled in preparation for the final assembly steps to complete the knife. Alternatively, the heat processing could be a batch operation which would be slower but would have better control of the cooling rate.

The above coloring process could be used to make other Type 60 Nitinol articles such as jewelry. Type 60 Nitinol is body compatible and could be used to make gold colored ear rings and finger rings in which jewels could be securely mounted. Gold mountings for jewels in rings are so weak that it is commonplace to lose the jewels by catching the mounting prongs on clothing and the like, bending the prongs so the jewel falls out. A Type 60 Nitinol ring heat treated to a gold color would have mounting prongs so strong that loss of jewels would become a rare occurrence.

After polishing and heat treating to obtain the desired color tone on the blade and the edge of the tang 36, the handle slabs 42 are aligned with the tang 36 and the rivet holes 55 and bushing hole 72 are back drilled in the slabs 42, using the rivet holes 64 and the bushing hole 70 in the tang 36 as drill guides if the holes are not already drilled during the cutting of the slabs 42. The counter-bores 56 are drilled in the handle slabs 42 using a pilot counterbore drill guided by the holes 55, and the rivets 40 are inserted in the holes 64 in the tang 36. An adhesive/sealant is applied to the inside surfaces and the counterbores 56 of both handle slabs 42, and to the axial holes 61 in the rivet shanks 62. A roll pin 60 is inserted into the axial holes 61 in the rivets on one side of the handle and the rivets are inserted into the rivet holes in the handle slabs 42. The handle slabs 42 are aligned and applied on the tang 36 and the rivets 40 are pressed together to seat the roll pin 60 in the axial holes 61 in the rivet shanks 62 and the engage the underside of the rivet heads 54 with the shoulder 58 of the counterbore 56. A preferred adhesive/sealant is a modified epoxy composition called Permabond Grade 309 made by Permabond, Int'l., a division of National Starch and Chemical Co. in Englewood, N.J. This composition adheres the handle slabs 42 to the tang 36 and adheres the roll pin 60 in the axial holes 61 to provide enhanced retention in addition to that provided by the roll pin 60 by itself. The adhesive/sealant also seals the interface between the handle slabs 42 and the tang 36, and seals the rivet head 54 in the counterbore 56. After curing, it is inert to the environments encountered where knives are used, and is a food-grade material, approved by the FDA for use in meat cutting operations.

After the adhesive/sealant is cured, attached handle slabs 42 made of wood may be saturated with linseed oil or food grade mineral oil to seal the wood pores against water, and the slabs are polished with a buffing compound, preferably the Glaz Woch, available from Ralph Maltby in Newark, Ohio. The polished handle is very smooth and the attractive grain of the exotic hardwood shows clearly and is set off beautifully by the mirror sheen of the polished blade. Even though the handle is very smooth, it is not slippery and can be securely gripped by hand, even when wet.

The last step in the process for making the knife is sharpening the edge. The hardness of the Nitinol material makes it possible to obtain an extremely sharp and potentially dangerous edge on the blade which could be injurious to workers manufacturing the knife, so edge sharpening is postponed to the last step. To avoid prematurely producing a sharp edge on a hollow ground blade that could potentially be dangerous if the ground blank is not handled carefully, I leave an unsharpened edge of about 0.030 thickness which an be quickly sharpened as the last step. The final sharpening step produces an edge of about 7.5° from the centerline, or 15° edge-to-edge. This edge is ground onto the cusp of the hollow ground surface 390 or the wedge cut surfaces to produce a durable, razor-sharp edge on the knife. The sharp cusp of the edge is virtually immune to corrosion or tarnishing which normally dulls an edge in knives and other cutting instruments made of conventional materials. Strong chlorine cleaning solutions eat away the edge of conventional stainless steel blades resulting in dulling of the edge as quickly as overnight, even if the knife is not used. Such strong chlorine cleaning solutions have no significant affect on the Type 60 Nitinol knife so the blade edge remains as sharp despite exposure to these solutions. Moreover, the blade is so hard and tough that it retains its sharpness, even when cutting hard materials such as hemp and fiberglass, for much longer than conventional materials, especially stainless steels that are formulated to resist corrosion by low percentages of carbon.

The processes described above can also be used for making cutting instruments other than knives. For example, a razor blade 400 in a disposable cartridge 402 permanently or removably mounted on a handle 404 as shown schmatically in FIGS. 38 and 39, can be made from a roll of thin gauge Type 60 Nitinol strip material mounted in a plastic base 406 that is held by or integral with a handle. Such blades are extremely sharp and stay sharp for an extended period of use, despite their exposure to soap, water, and high humidity. Their higher cost is offset by the extremely long life and extreme sharpness during the long life. The primary cause of dulling of razor blades is corrosion of the blade material at the cusp of the blade edge and, to a lesser extent, erosion of the corroded edge material by the beard stubble. Even when the razor blade does not appear corroded, there is a small degree of corrosion concentrated at the cusp of the edge which rounds off the cusp and dulls the edge. Type 60 Nitinol resists this corrosion far better than stainless steel and also has the hardness and toughness to resist erosion of the cusp from which softer stainless steel formulations suffer.

Figures 38, 39:
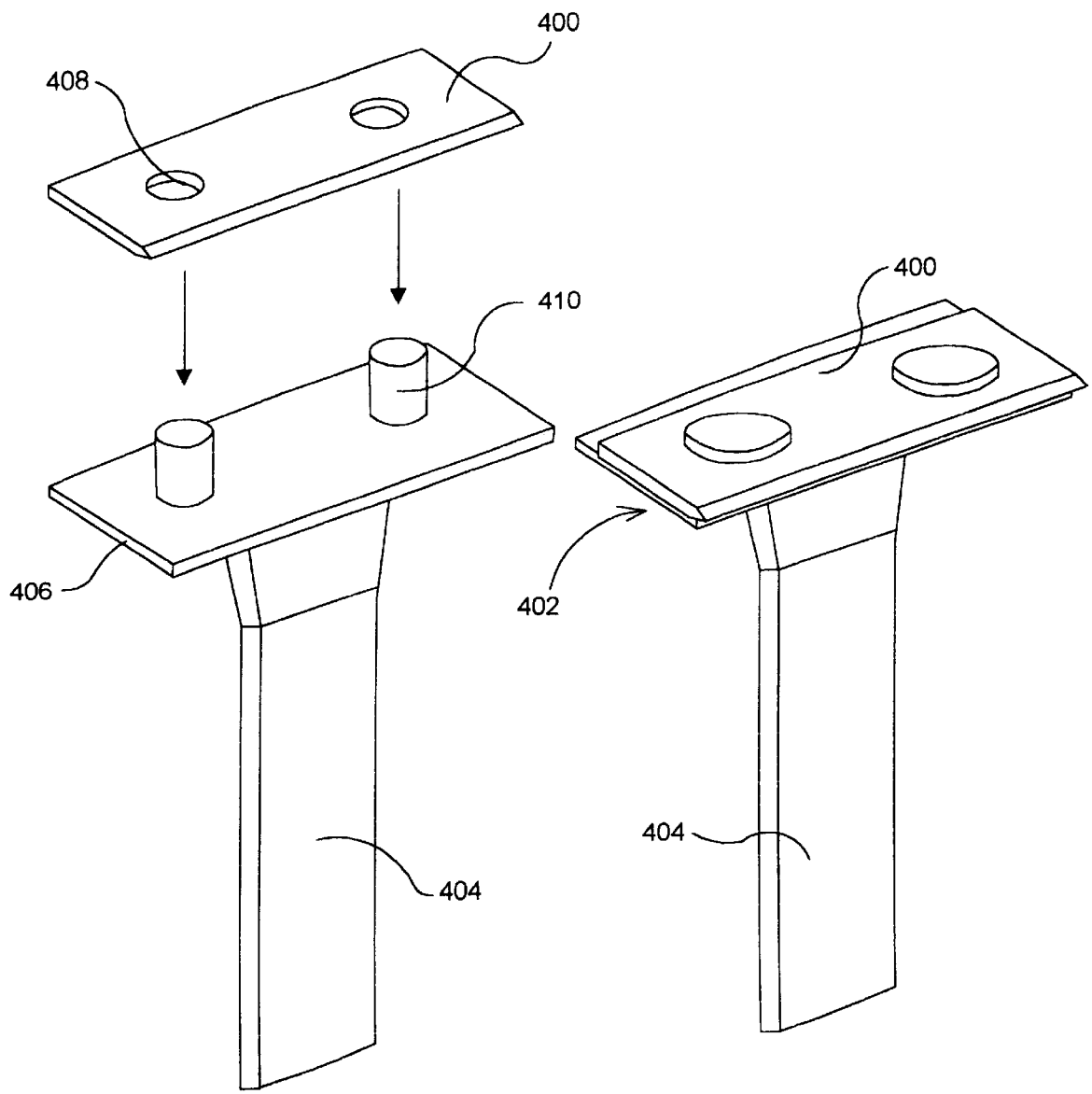
FIG. 38 is an exploded schematic perspective view of a razor made in accordance with this invention.
FIG. 39 is a perspective schematic view of a razor assembled from the parts exploded in FIG. 38.

The blade 400 has attachment structure by which it is mounted in the base 406. The attachment structure shown in this embodiment includes a pair of holes 408 which receive plastic pegs 410 that are heat softened and deformed to hold the blade 400 down against the base 406 as shown in FIG. 39. If the blade 400 is to be mounted to self align to the profile of the skin to be shaved, it can be a much thinner and narrow strip of Type 60 Nitinol sharpened along one edge and spot welded by resistance or laser welding to a titanium support bracket that is spring loaded in a slot in the cartridge that clips into the handle in conventional razors.

The narrow strip of Type 60 Nitinol is slit from a sheet of type 60 Nitinol hot rolled to a thickness of about 0.015–0.050 inch. The slitting is preferably done by gang roller shears or gang laser cutters and the strips are manipulated by a vacuum handling system. For razor manufacturers that prefer to use the same cartridge fabrication machines they currently use, the individual strips are laser welded end-to-end and rolled in a large coil that can be used in the continuous high speed automated sharpening and cartridge fabrication machines now used to make razor cartridges. The strip of Type 60 Nitinol may be heat treated to a hardness of about 62 on the Rockwell C scale by heating to about 600°

C. and rapidly quenched. The edge, hardened in this manner, is fairly brittle, but it is protected in the mounting handle or cartridge against impacts so the hardness is not a detriment in this application. The only detriment, if it could be call that, is the extremely long life that a razor blade of Type 60 Nitinol has. Its immunity to corrosion in the presence of environmental influences that commonly degrade the sharpness of conventional blades, and its erosion resistance to beard stubble, makes the Type 60 Nitinol razor last so long that widespread adoption of this technology by the razor industry will greatly reduce the total sales volume of razor blades.

Medical instruments such as scalpels, chisels and files made of body compatible and FDA approved Type 60 Nitinol would be very safe for use in the operating room because of the body compatibility, and would stay sharp for long periods of use. Scalpel blades are now normally discarded after use, but Type 60 Nitinol blades would be so long lasting and corrosion resistant that they could be sterilized and reused many times, resulting in much less waste of medically dangerous waste and greatly increased efficiency of hospital operating rooms. Type 60 Nitinol takes an extremely smooth finish and is very slippery, so its use as scalpel blades would be ideal because it would cut through skin and tough collagen with no tendency to stick in the incision.

Cutter inserts for the blades of stump grinders, brush cutters, lawn mowers, chipper/shredders, etc. would be sharp and stay sharp because the Nitinol is hard and tough, not brittle, so there is little danger of the blade material shattering and producing dangerous shrapnel.

Food processor, blender, and coffee grinder blades likewise would be made with much harder and tougher cutting edges that would stay sharp and never rust or corrode. The high impact that blender, food processor and coffee grinder blades experience require that they be made of steel formulations that are not brittle, but the non-brittle steels are soft and do not hold an edge. Type 60 Nitinol is hard but tough; it will not shatter or chip on impact if it is thermally conditioned as described above.

Conventional camp saws are made of high carbon steel so that the saw teeth can be tempered to a high degree of hardness, but the high carbon steel rusts quickly if it is exposed to moisture and not immediately dried and oiled. That much care is difficult to provide in the field, so camp saws often become rusty and dull. A Type 60 Nitinol saw blade 415, shown in FIGS. 40 and 41, will not rust and yet it is naturally hard, on the order of 53 on the Rockwell C scale, and has a cutting edge 430 that can be heat treated to a hardness of 62 or higher on the Rockwell "C" scale.

Figure 40:
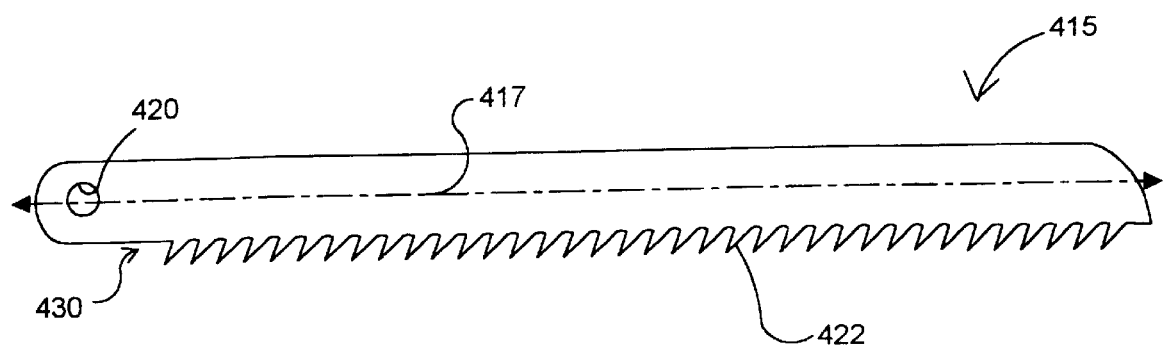
FIG. 40 is a plan view of a saw blade made in accordance with this invention.

The saw blade 415 is cut out of a sheet of Type 60 Nitinol hot-rolled from a hot forged ingot of Type 60 Nitinol by laser cutting at a high cutting rate, on the order of 100 inches/minute or higher. This produces a flat, elongated blade blank having two planar faces and a direction of elongation 417. Attachment structure at one or both ends of the elongated saw blade, in the form of notches or holes 420 as shown in FIG. 40, and pointed cutting teeth 422 are cut into the profile of the saw blank at the same time that the saw blank is cut out of the sheet.

Figure 42:
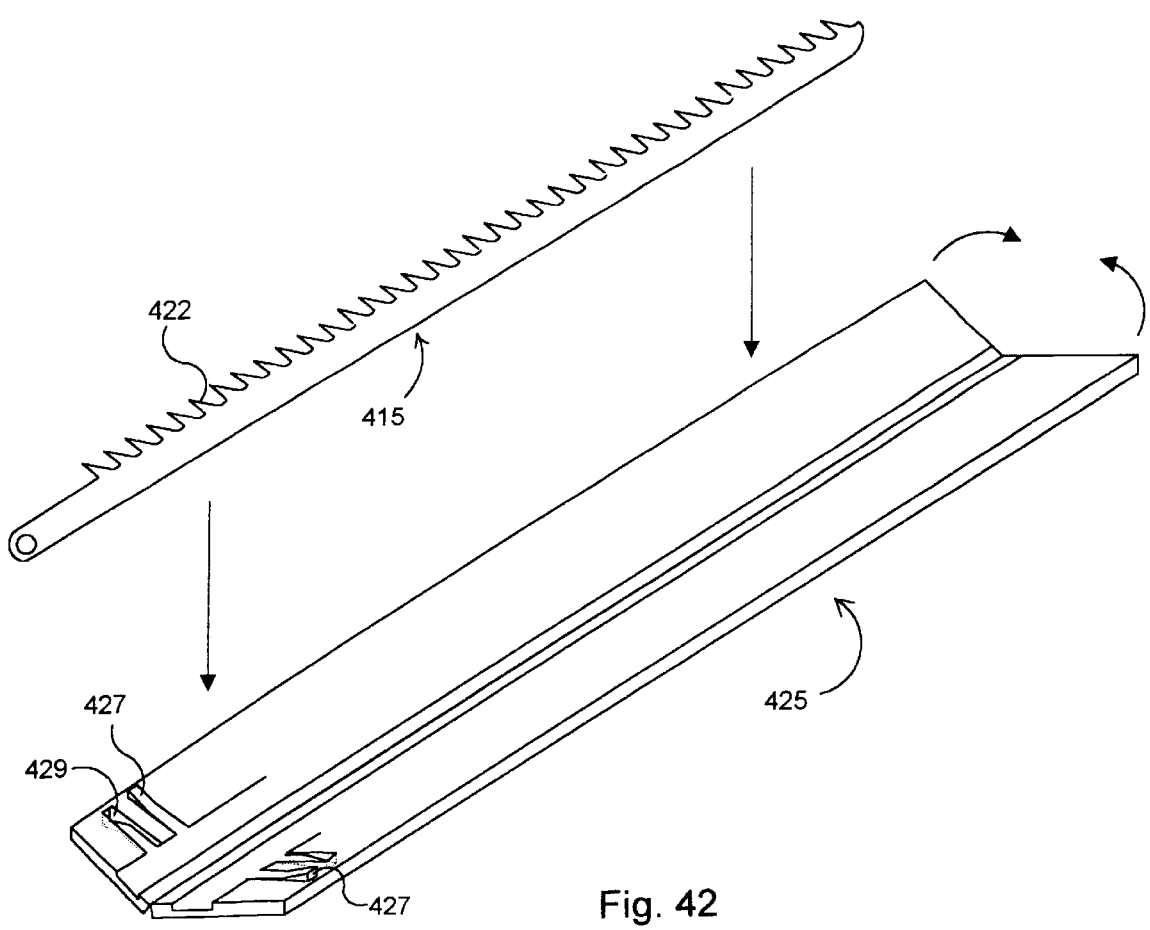
FIG. 42 is a perspective view of the saw blade shown in FIG. 40 and a tool for setting the teeth of the saw blade.

As shown in FIG. 42, the teeth of a Type 60 Nitinol saw blade 415 can be set by heating the toothed edge of the saw blade to a high plastic temperature, preferably red hot, to reduce its yield strength and elasticity. At a temperature of above 500° C., preferably about 650° C., the Type 60 Nitinol can be plastically deformed and, if held in the deformed position while it cools to below about 400° C., will retain its deformed position with no springback. The saw teeth 422 are set by heating to the high plastic temperature and forcing a tool steel die 425, having alternating beveled ramps 427 and recesses 429 machined therein at the saw teeth locations, to bend the teeth 422 laterally out from the plane of the blade in alternating directions. The die 425 is held closed while the teeth 422 cool in their set positions, and is then opened for removal of the saw blade blank 415.

Figure 41:
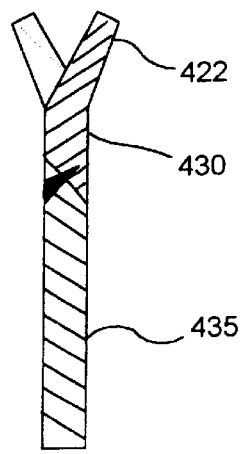
FIG. 41 is a cross sectional elevation of a saw blank having teeth set in accordance with this invention and showing in dotted lines the tooth material that will be removed for sharpening.

The teeth are ground sharp along one or both inside edges, as indicated in FIG. 41, by a narrow grinding wheel or disc, preferably having diamond or PCBN abrasive particles embedded in its surface. For high volume production, the grinding discs are ganged on an apparatus that grinds the edges on one side of all the teeth on one side of the blade at the same time. The grinding discs do not last as long as they last when grinding conventional steel saw blade material which is hardened after grinding, but the amount of Type 60 Nitinol that must be removed to sharpen the saw teeth is small, so the discs can be made to last long enough to be economical, especially considering the greater price that a corrosion-proof saw can command in the market place.

After grinding, the saw blade is heat conditioned as noted above to remove any brittleness in the teeth resulting from excessive heating during grinding. The saw blades are cleaned and assembled on a holding fixture and inserted into an oven where they are raised to the temperature at which the gold color appears on the surface, about 500° C. They are then allowed to cool slowly in the oven to a temperature below about 400° C. and are removed from the oven. The entire blade is now tough, springy and strong, and is at about 50–53 on the Rockwell C hardness scale. To increase the hardness of the teeth without creating excessive brittleness, the toothed edge 430 is heated by induction heating which raises the temperature of the teeth to a desired high temperature in the region of 500–600° C. The heating is done in a controlled temperature environment in which the cooling rate can be controlled to prevent excessively rapid cooling of the teeth that would cause brittleness. The temperature to which the edge portion of the blade is raised can be set to produce a different color, say blue, which would give the Type 60 Nitinol saw a very distinctive appearance.

The saw blade 415 may be made as shown in FIG. 41 with a cutting edge 430 made of Type 60 Nitinol welded to a saw body 435 made of lower cost material with a higher modulus, such as titanium. This produces a lower cost saw with a higher modulus. The welding may be laser welding or roller resistance welding that would require little or no touch-up surface grinding.

The same process can be used to make band saw blades, hand saw blades and circular saw blades. The band saw blade are made in strips of thin Type 60 Nitinol material and cut to length and welded in a loop using laser welding. The teeth are tough and abrasion resistant, so they are good candidates for cutting problem materials such as composites that quickly dull conventional hardened steel band saw blades.

Polycrystalline cubic boron nitride tooling may be used for machining the flat surfaces of the knife blank and the knife edge instead of grinding. The cutting depth must be more shallow than for normal machining, and the feed rate is also slower. Cutting with PCBN tools generate lower cutting forces and removes heat from the workpiece in the chips, so the workpiece remains cool. Although the PCBN is far more expensive than grinding wheels and belts, the benefits of its use compared to grinding are better surface finish, reduction of unwanted heating of the Type 60 Nitinol ground surface, and elimination of grinding dust.

Obviously, numerous modifications and variations of the preferred embodiments disclosed herein will occur to those skilled in the art in view of this specification. Accordingly, it is to be expressly understood that these modifications and variations, and the equivalents thereof, are to be embraced within my invention as defined by the spirit and scope of the following claims, Wherein I claim:

1. A process for producing surface material on a part made of Type 60 Nitinol parent material, said surface material being electrically non-conductive hard lustrous, non-stick and integral with the parent material, said surface material having a color from a group of colors consisting of gold, red/purple, blue, silver, and green, said process comprising:
   a. polishing said part to a smooth finish;
   b. heating said part to a temperature of about 400° C.–650° C. in a gaseous atmosphere simulating indoor air at room temperature until said part attains said color; and
   c. allowing said part to cool slowly in said atmosphere to room temperature.

2. A process as defined in claim 1, further comprising:
   d. polishing said cooled part with a fine grit diamond paste on a buffing wheel; and
   e. repeating steps b–d at least one additional iteration.

3. A process for producing a hard, non-stick, chemically inert and electrically non-conductive surface material on a Type 60 Nitinol part, comprising:

heating said part to a temperature of about 400° C.–700° C. in a gaseous atmosphere containing at least about 20% oxygen until said part attains said surface material; and cooling said part to room temperature.

4. A process for producing surface material on a part made of Type 60 Nitinol parent material, said surface material being electrically non-conductive, hard lustrous, non-stick and integral with the parent material, said surface material having a color from a group of colors consisting of gold, red/purple, blue, silver, and green, said process comprising:
   a. polishing said part to a smooth finish;
   b. heating said part to a temperature of about 400° C.–650° C. in a gaseous atmosphere simulating indoor air at room temperature until said part attains said color; and
   c. allowing said part to cool to room temperature.

* * * * *